United States Patent [19]

Kato et al.

[11] Patent Number: 5,052,247
[45] Date of Patent: Oct. 1, 1991

[54] HYDRAULIC CONTROL APPARATUS FOR BELT-AND-PULLEY TYPE CONTINUOUSLY VARIABLE TRANSMISSION, INCORPORATING FAIL-SAFE PROTECTIVE MEANS

[75] Inventors: Nobuyuki Kato; Seitoku Kubo; Katsumi Kouno; Tetsuya Abe; Hiroshi Itoh; Kunio Morisawa, all of Toyota; Ryoji Habuchi, Aichi, all of Japan

[73] Assignee: Toyota Jidosha Kabushiki Kaisha, Toyota, Japan

[21] Appl. No.: 564,140

[22] Filed: Aug. 8, 1990

[30] Foreign Application Priority Data

| Aug. 9, 1989 | [JP] | Japan | 1-206083 |
| Aug. 9, 1989 | [JP] | Japan | 1-206084 |
| Feb. 1, 1990 | [JP] | Japan | 2-23581 |
| May 17, 1990 | [JP] | Japan | 2-127786 |

[51] Int. Cl.$^5$ .................................. B60K 41/12
[52] U.S. Cl. .................................. 74/868
[58] Field of Search .................................. 74/866, 869

[56] References Cited

U.S. PATENT DOCUMENTS

| 4,565,110 | 1/1986 | Itoh | 74/868 |
| 4,628,773 | 12/1986 | Itoh et al. | 74/867 |
| 4,734,082 | 3/1988 | Tezuka | 74/867 X |
| 4,747,807 | 5/1988 | Nakamura et al. | 74/868 X |
| 4,752,277 | 6/1988 | Morimoto | 74/869 X |
| 4,753,627 | 6/1988 | Kawamoto | 74/867 X |
| 4,867,732 | 9/1989 | Soga et al. | 74/866 X |

FOREIGN PATENT DOCUMENTS

| 52-98861 | 8/1977 | Japan . |
| 59-159456 | 9/1984 | Japan . |
| 60-95262 | 5/1985 | Japan . |
| 64-49751 | 2/1989 | Japan . |

*Primary Examiner*—Dwight Diehl
*Attorney, Agent, or Firm*—Oblon, Spivak, McClelland, Maier & Neustadt

[57] ABSTRACT

An apparatus for controlling a vehicle continuously variable transmission, including a directional control valve having a first spool movable between a shift-down and a shift-up position, a flow control valve including a second spool movable between a flow-restricting and a non-restricting position, and a first and a second solenoid-operated valve for applying an actuating pressure to the first and second spools. The directional and flow control valves and the solenoid-operated valves are adapted such that the first and second spools are moved toward the shift-up and flow restricting positions, respectively, when the actuating pressure is not applied to the spools, or when solenoid coils of the two solenoid-operated valves are both off. The directional control valve may have a shift-down chamber for receiving a pilot pressure to move the first spool to the shift-down position when a failure of one of the solenoid coils exists while the vehicle speed is lower than a predetermined limit.

15 Claims, 18 Drawing Sheets

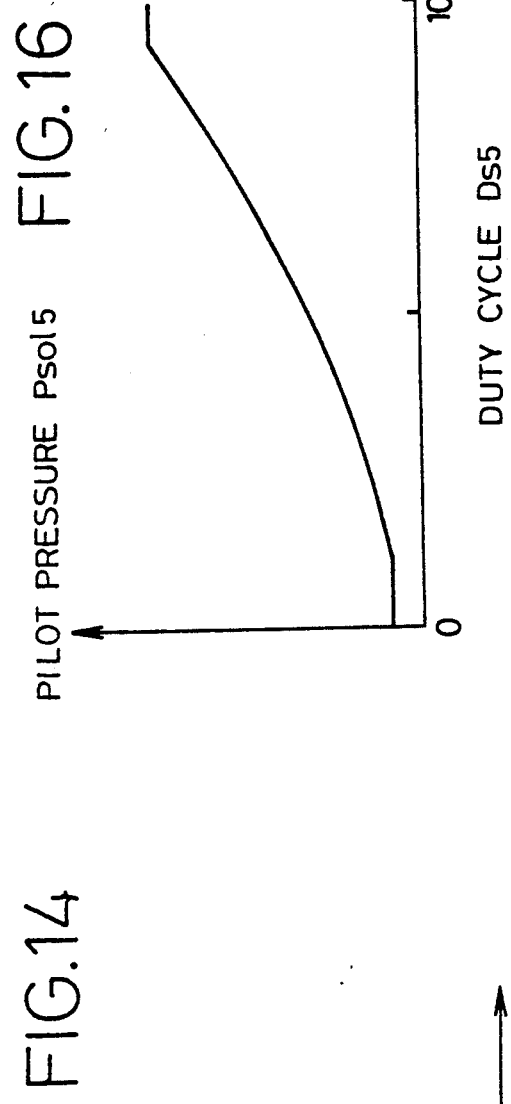
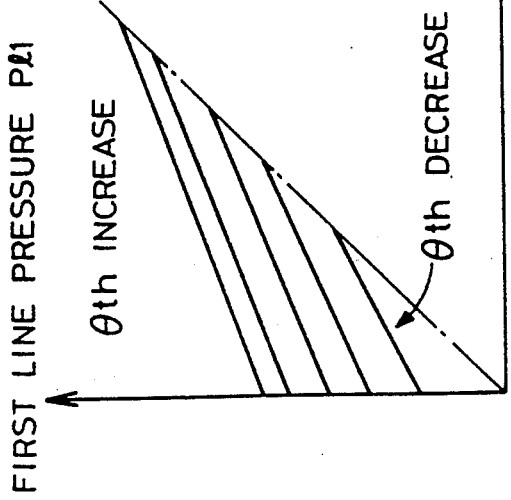

FIG.19

| HYDRAULIC CONTROL MODE | 3RD SOLENOID VALVE 330 | 4TH SOLENOID VALVE 346 | 5TH SOLENOID VALVE 392 | LOCK-UP CLUTCH 36 | 2ND LINE PRESSURE $P\ell_2$ | CONTROL MODES |
|---|---|---|---|---|---|---|
| A | OFF | OFF | OFF | 1ST RELEASE MODE | NORMAL | |
| B | OFF | OFF | ON | 1ST RELEASE MODE | REDUCTION | $P\ell_2$ REDUCTION IN POSITION "N", AND REVERSE INHIBIT |
| C | ON | OFF | OFF | ENGAGING MODE | NORMAL | LOCK-UP CLUTCH ENGAGEMENT IN POSITION "D" |
| D | ON | OFF | ON | ENGAGING MODE | REDUCTION | $P\ell_2$ REDUCTION AT HIGH VEHICLE SPEED |
| E | OFF | ON | OFF | RAPID RELEASE MODE | NORMAL | LOCK-UP CLUTCH RAPID RELEASE |
| F | OFF | ON | ON (DUTY CYCLING) | RAPID RELEASE MODE | INCREASE | ACCUMULATOR BACK PRESSURE CONTROL UPON N-D AND N-R SHIFTING OPERATIONS |
| G | ON | ON | OFF | 2ND RELEASE MODE | NORMAL | LOCK-UP CLUTCH RELEASE IN POSITION "D" |
| H | ON | ON | ON | 2ND RELEASE MODE | INCREASE | $P\ell_2$ INCREASE UPON RAPID SHIFT-DOWN OF CVT |

| No. | SOLENOID DRIVE SIGNAL | DIAGNOSIS SIGNAL | DIAGNOSIS |
|---|---|---|---|
| 1 | L | L | NORMAL |
| 2 | H | H | NORMAL |
| 3 | L | H | DISCONNECTION |
| 4 | H | L | GND SHORT-CIRCUITING |

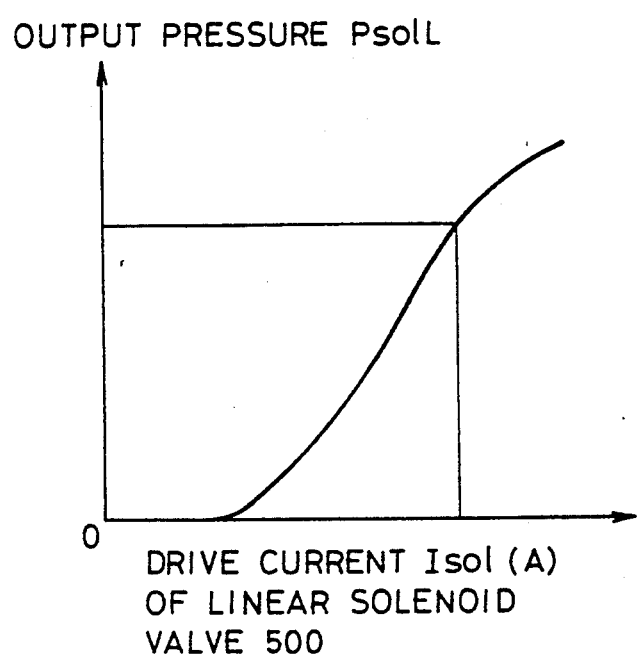

HYDRAULIC CONTROL APPARATUS FOR BELT-AND-PULLEY TYPE CONTINUOUSLY VARIABLE TRANSMISSION, INCORPORATING FAIL-SAFE PROTECTIVE MEANS

BACKGROUND OF THE INVENTION

1. Field of the Invention

The present invention relates to a hydraulic control apparatus for controlling a hydraulically operated continuously variable transmission of belt-and-pulley type used for a motor vehicle.

2. Discussion of the Prior Art

A continuously variable transmission whose speed ratio is continuously variable is known as a transmission incorporated in a power transmitting system for a motor vehicle. An example of a belt-and-pulley type continuously variable transmission is disclosed in laid-open Publication No. 52-98861 of unexamined Japanese Patent Application. This continuously variable transmission includes a first and a second shaft, a pair of variable-diameter pulleys provided on the first and second shafts, respectively, a belt connecting the pulleys, and a pair of hydraulic actuators for changing effective diameters of the pulleys.

For controlling the speed ratio of such a belt-and-pulley type continuously variable transmission, there is provided a hydraulic control apparatus as disclosed in laid-open Publication Nos. 59-159456 and 60-95262 of unexamined Japanese Patent Applications, which incorporates a shift control valve assembly including a directional control valve and a flow control valve each of which uses a spool. The directional control valve is adapted to change the direction in which the speed ratio of the continuously variable transmission is changed, namely, to selectively effect the shift-up and shift-down operations of the transmission. The flow control valve functions to control the speed or rate at which the speed ratio of the transmission is changed in the shift-up or shift-down direction. These directional and flow control valves are operated by an actuating hydraulic pressure which is applied to the spools through respective solenoid-operated valves that are controlled by drive signals generated by a suitable control device.

In controlling the continuously variable transmission, it is generally desired that the continuously variable transmission be slowly shifted up in the event of a trouble associated with the shift control valve assembly, in order to avoid an excessive rise in the speed of the engine. That is, if the transmission is shifted down during a high speed running of the vehicle, the engine speed is forcibly raised. To avoid this phenomenon, the electric control device of the hydraulic control apparatus is usually adapted such that the speed ratio of the continuously variable transmission is relatively slowly changed in the shift-up direction when the two solenoid-operated valves for the directional and flow control valves are both placed in the OFF or de-energized state. In this fail-safe arrangement, the transmission is slowly shifted up in the event of a trouble with the solenoid-operated valves. Conventionally, the spools of the directional and flow control valves are biased by respective springs toward the shift-down position and the flow-restricting position, respectively, whereby the transmission is slowly shifted down in the event that the actuating pressure for operating the spools cannot be applied to the spools for some reason or other. This shift-down of the continuously variable transmission is not desired for the reason stated above.

In the above fail-safe arrangement, whenever a trouble with the solenoid coil of the directional or flow control valve occurs, the speed ratio of the transmission (speed of the input shaft/speed of the output shaft) is lowered toward the smallest value due to the slow shift-up operation. If the vehicle is stopped in this condition, however, the vehicle cannot be smoothly started since a sufficient drive force for starting the vehicle cannot be obtained with the smallest speed ratio of the transmission.

In a hydraulic control apparatus as disclosed in laid-open Publication No. 64-49751, the four combinations of the ON-OFF states of the two solenoid-operated valves for the directional and flow control valves provide four shifting modes of the continuously variable transmission, that is, a slow shift-up mode, a rapid shift-up mode, a slow shift-down mode and a rapid shift-down mode. Further, a medium shift-up mode and a medium shift-down mode are established by operating the solenoid-operated valve for the flow control valve at the controlled duty cycle. The directional control valve has an output port from which a first line pressure is produced when the valve is placed in one of the shift-up modes. This output port is connected to the driving side hydraulic cylinder (one of the two hydraulic actuators), through a by-pass line equipped with a check valve having a flow restricting function. The first line pressure is applied to the driving side hydraulic cylinder primarily through the by-pass line when the directional control valve is placed in the slow shift-up mode. The provision of the by-pass line eliminates a port of the flow control valve for the slow shift-up operation of the transmission, thereby enabling the spool of the flow control valve to have only three lands. This arrangement results in shortening the overall length of the flow control valve, reducing the mass of this valve, and thereby improving the operating response of the valve over a relatively wide range of the flow rate during a duty cycling operation of the corresponding solenoid-operated valve.

However, the known hydraulic control apparatus as disclosed in the above publication No. 64-49751 suffers from relatively low durability of the hydraulic circuit, due to early deterioration of the check valve provided in the by-pass line indicated above. The check valve has a valve member in the form of a ball, and a valve seat on which the ball is seated. The ball and the valve seat are inevitably worn out in a relatively short time, due to repeated abutting contact of the ball with the seat when the slow shift-up and shift-down operations of the transmission are alternately effected.

SUMMARY OF THE INVENTION

It is therefore a first object of the present invention to provide a highly reliable hydraulic control apparatus for controlling a hydraulically operated belt-and-pulley type transmission for a motor vehicle, which permits the transmission to be slowly shifted up irrespective of the operating states of the solenoid-operated valves for the directional and flow control valves, in the event that the valve actuating pressure cannot be applied to the control valves.

A second object of the invention is to provide a highly durable hydraulic control apparatus for a vehicle continuously variable transmission, wherein a check valve is not used in the by-pass line which is primarily used for applying the line pressure from the directional control valve to the driving side hydraulic actuator for slowly shifting up the transmission.

A third object of the invention is to provide a highly reliable hydraulic control apparatus for a vehicle continuously variable transmission, which assures safe running and smooth starting of the vehicle, in the event of a trouble with the solenoid coil for the shift control valve assembly.

The first object may be achieved according to one aspect of the present invention, which provides a hydraulic control apparatus for controlling a hydraulically operated continuously variable transmission of a motor vehicle whose speed ratio is continuously variable, comprising: (a) pressure generating means for producing an actuating pressure; (b) a directional control valve including a first spool which is movable between a shift-down position and a shift-up position for changing the speed ratio of the transmission in a shift-down and a shift-up direction, respectively, the first spool being moved to the shift-up position when the actuating pressure is not applied to the first spool; (c) a first solenoid-operated valve responsive to a first electric signal, for applying the actuating pressure to the first spool to move the first spool to the shift-down position; (d) a flow control valve including a second spool which is movable between a flow-restricting position for restricting a flow of a fluid therethrough for establishing a first rate at which the speed ratio of the transmission is changed, and a non-restricting position for establishing a second rate higher than the first rate, the second spool being moved to the flow-restricting position when the actuating pressure is not applied to the second spool; and (e) a second solenoid-operated valve responsive to a second electric signal, for applying the actuating pressure to the second spool to move the second spool to the non-restricting position.

In the hydraulic control apparatus constructed according to the first aspect of the present invention as described above, the first spool of the directional control valve is placed in the shift-up position while the second spool of the flow control valve is placed in the flow-restricting position, irrespective of the operating states of the first and second solenoid-operated valves, in the event that the actuating pressure cannot be supplied to the spools through the operating states of the respective first and second solenoid-operated valves, due to a failure of the pressure generating means or abnormality associated with the fluid passages from the pressure generating means to the solenoid-operated valves, for any other reasons. Therefore, the continuously variable transmission is slowly shifted up toward the shift-up position, if the spools of the directional and flow control valves cannot be actuated by the actuating pressure due to any trouble with the related hydraulic components.

In one form of the present hydraulic control apparatus, the first spool and the second spool are biased by respective springs toward the shift-up and flow-restricting positions, respectively, whereby the spools are moved to the shift-up and flow-restricting positions when the actuating pressure is not applied to the spools.

The second object indicated above may be achieved according to a second aspect of the present invention, which provides a hydraulic control apparatus for controlling a hydraulically operated continuously variable transmission of a motor vehicle which includes a pair of variable-diameter pulleys, a transmission belt connecting the pair of pulleys, and a first and a second hydraulic actuator which selectively receive a first line pressure and a second line pressure lower than the first line pressure, for changing effective diameters of the pair of pulleys and thereby continuously changing a speed ratio of the transmission, the first and second line pressures being supplied through a first and a second pressure line, respectively, the hydraulic control apparatus comprising: (a) a directional control valve including a drain port, a first and a second input port connected to the first pressure line, a third input port connected to the second pressure line, a first output port, a second output port, a third output port, and a first spool which is movable between a shift-up position for fluid communication between the first output and input ports, between the second output and input ports and between the third output and input ports, and a shift-down position for fluid communication between the first output port and the drain port and between the third output port and the second input port; (b) a first, a second and a third connecting line connected to the first, second and third output ports, respectively; and (c) a flow control valve including a fourth input port communicating with the first output port through the first connecting line, a fourth output port communicating with the second output port through the second connecting line and communicating with the first hydraulic actuator, a fifth output port communicating with the second hydraulic actuator, a fifth input port communicating with the third output port through the third connecting line, and a second spool which is movable between a non-restricting position for fluid communication between the fourth output and input ports and between the fifth output and input ports, and a flow-restricting position for fluid communication between the fourth output and input ports and between the fifth output and input ports.

In the hydraulic control apparatus constructed according to the second aspect of the present invention, the first line pressure supplied through the first pressure line to the directional control valve is fed from the second output port to the first hydraulic actuator primarily through the second connecting line, when the first spool of the directional control valve is placed in its shift-up position while the second spool of the flow control valve is placed in its flow-restricting position. Further, when the first spool is placed in the shift-down position, the second output port of the directional control valve is closed by the first spool, whereby the second connecting line is disconnected from the second output port. Therefore, the second connecting line functions as a conventionally used by-pass line which connects the directional control valve and the first hydraulic cylinder while by-passing the flow control valve. However, this second connecting line as the by-pass line does not require a conventionally used check valve, and is accordingly free of deterioration due to wearing of the check valve.

The third object indicated above may be achieved according to a third aspect of the present invention, which provides a hydraulic control apparatus for controlling a hydraulically operated continuously variable transmission whose speed ratio is continuously variable, said hydraulic control apparatus comprising: (a) a directional control valve including a first spool which is movable between a shift-down position and a shift-up position for changing the speed ratio of the transmission in a shift-down and a shift-up direction, respectively; (b) pressure generating means for producing an actuating pressure; (c) a first solenoid-operated valve operable for applying the actuating pressure to the first spool; (d) a flow control valve including a second spool which is movable between a flow-restricting position for restricting a flow of a fluid therethrough for establishing a first rate at which the speed ratio of the transmission is changed, and a non-restricting position for establishing a second rate higher than the first rate; (e) a second solenoid-operated valve operable for applying the actuating pressure to the second spool, the first and second solenoid-operated valves having respective solenoid coils which are both turned off to establish a slow shift-up mode of the transmission in which the transmission is slowly shifted up; and (f) pilot pressure generating means for producing a pilot pressure. The first and second solenoid-operated valves have respective solenoid coils which are both turned off to establish a slow shift-up mode of the transmission in which the transmission is slowly shifted up. The directional control valve further includes means for defining a shift-down chamber for receiving the pilot pressure to move the first spool toward the shift-down position.

In the hydraulic control apparatus constructed according to the third aspect of this invention, the slow shift-up mode is established when the coils of the first and second solenoid-operated valves are both off. Accordingly, the slow shift-up mode is established in the event of a failure of one or both of the solenoid coils of the solenoid-operated valves, since the defective solenoid-operated valve or valves is/are placed in the off position. Therefore, the vehicle can continue to run at a relatively high speed, without an excessive rise of the engine speed. However, it is desired that the transmission be shifted toward the shift-down position, where the trouble occurs while the vehicle is running at a relatively low speed or where the trouble exists when the vehicle is started or re-started. According to the present arrangement wherein the pilot pressure generating means is provided to apply the pilot pressure to the shift-down chamber of the directional control valve, the pilot pressure can be applied to the shift-down chamber upon occurrence of a failure of the solenoid coil of the first solenoid-operated valve, for example, so that the transmission is shifted down to permit the vehicle to start or continue to run at a relatively low speed.

In one form of this aspect of the invention, the directional control valve further includes a plunger having opposite ends one of which partially defines the shift-down chamber and the other of which is in abutting contact with an end of the first spool, and the actuating pressure is applied between the end of the first spool and the other end of the plunger.

The continuously variable transmission may be constructed so as to include a pair of variable-diameter pulleys, a transmission belt connecting the pair of pulleys, and a first and a second hydraulic actuator for changing effective diameters of the pair of pulleys. The tension of the belt may be controlled by a tension control pressure produced by a pressure regulating valve which includes a third spool operable for producing the tension control pressure, and means for defining a chamber for receiving the pilot pressure so that the third spool is moved to increase the tension control pressure depending upon the pilot pressure produced by the pilot pressure generating means. In this case, the pilot pressure generating means may be adapted to produce the pilot pressure when the vehicle running speed falls below a predetermined limit, so that the transmission is shifted down toward the shift-down position and the tension control pressure is increased to increase the tension of the belt. This arrangement permits smooth start of the vehicle in the event of a failure of the solenoid coil of the solenoid-operated valve or valves, because a large drive torque is provided from the output shaft of the shifted-down transmission, without slipping of the belt on the pulleys. Further, where the failure of the solenoid coil occurs during running of the vehicle, the transmission is rapidly shifted down with the belt tension increased when the vehicle speed falls below the predetermined limit.

For instance, the failure of the first solenoid-operated valve may be detected by a trouble detecting circuit provided in an electronic control device. When the electronic control device detects a failure with the solenoid coil of the first solenoid-operated valve while the vehicle is running at a speed exceeding a predetermined limit, the control device controls the pilot pressure generating means so as not to produce the pilot pressure, so that the first spool is maintained in the shift-up position. When the electronic control device detects a failure with the solenoid coil of the first solenoid-operated valve while the vehicle speed is not higher than the predetermined limit, the control device controls the pilot pressure generating means so as to produce the pilot pressure, so that the first spool is moved toward the shift-up position.

BRIEF DESCRIPTION OF THE DRAWINGS

The above and optional objects, features and advantages of the present invention will become more apparent by reading the following detailed description of presently preferred embodiments of the present invention, when considered in conjunction with the accompanying drawings, in which:

FIG. 14 is a graph indicating an output characteristic of the first pressure regulating valve of FIG. 4, i.e., a relationship between a first line pressure and a second line pressure or a pressure in a first hydraulic cylinder of the CVT;

FIG. 15 is a view indicating modes of operation of a lock-up clutch corresponding to different combinations of operating states of a third and a fourth solenoid valve of the apparatus of FIG. 2;

FIG. 16 is a graph indicating a relationship between the duty cycle of a fifth solenoid valve of the apparatus of FIG. 2 and a pilot pressure continuously changed with the duty cycle;

FIG. 25 is a graph indicating an operating characteristic of the linear solenoid valve of FIG. 24.

DETAILED DESCRIPTION OF THE PREFERRED EMBODIMENTS

Figure 1:
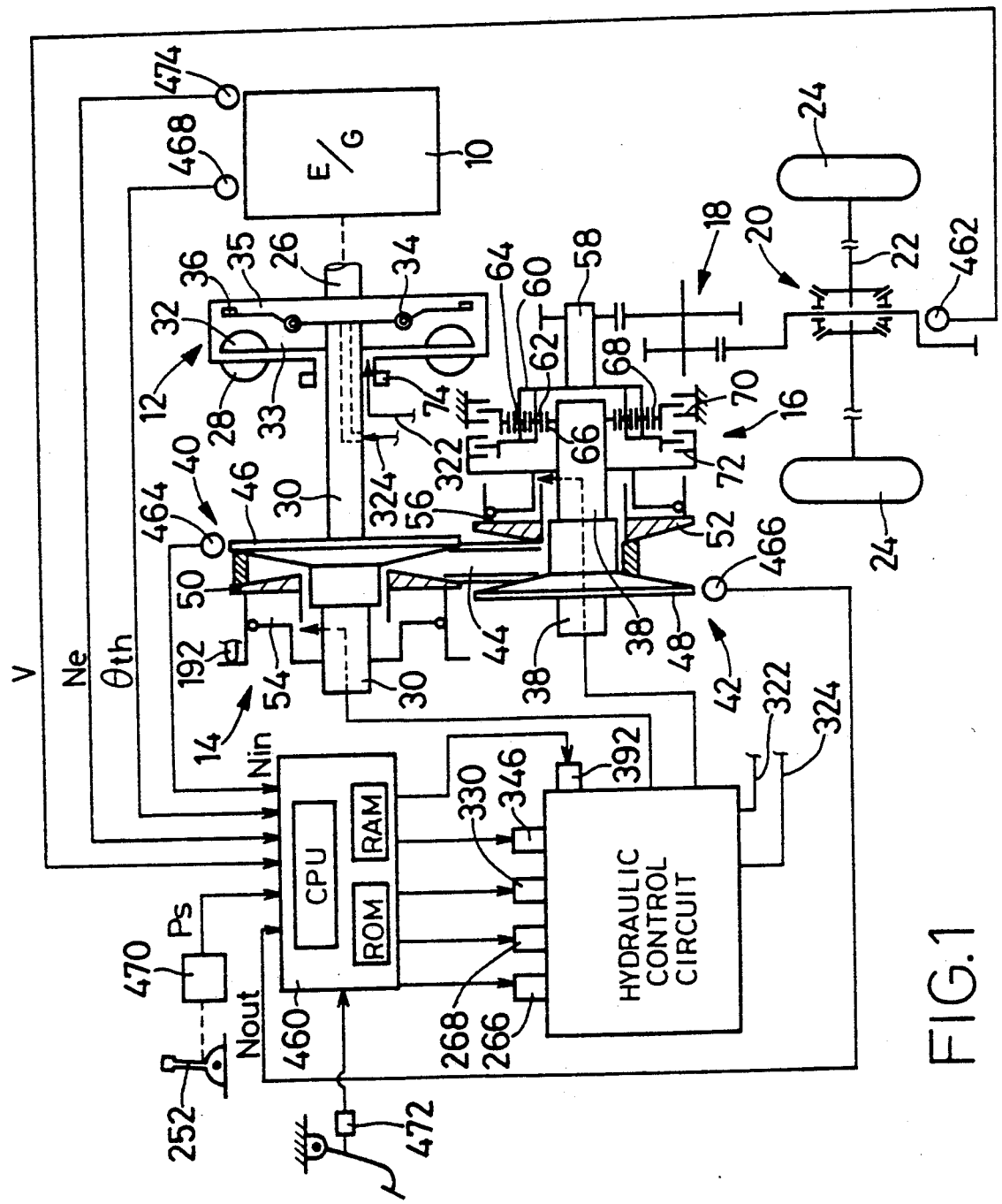
FIG. 1 is a schematic view of a vehicle power transmitting system including a continuously variable transmission, which is equipped with a hydraulic control apparatus constructed according to one embodiment of the present invention.

Referring first to FIG. 1, there is illustrated a power transmitting system of an automotive vehicle, for transmitting power from an engine 10 to drive wheels 24, 24. The power transmitting system includes: a fluid coupling 12 connected to the engine 10 through a crankshaft 26 and equipped with a lock-up clutch 36; a continuously variable transmission (hereinafter referred to as "CVT") 14 connected to the fluid coupling 12; a reversing gear mechanism in the form of a reversing device 16 connected to the CVT 14, for selecting a forward or a reverse running of the vehicle; an intermediate gear device 18 connected to the reversing device 16; a differential gear device 20 connected to the intermediate gear device 18; and a drive axle 22 connected to the differential gear device 20 and drive wheels 24.

The fluid coupling 12 includes a pump impeller 28 connected to the crankshaft 26 of the engine 10; a turbine impeller 32 which is fixed to an input shaft 30 of the CVT 14 and rotated by means of a working fluid from the pump impeller 28; the lock-up clutch 36 indicated above, which is fixed to the input shaft 30 through a damper 34; and means for defining an engaging chamber 33 communicating with an engaging line 322 (which will be described), and a releasing chamber 35 communicating with a releasing line 324 (which will be described). The fluid coupling 12, which is filled with the working fluid, is operated to effect engagement of the lock-up clutch 36 for direct connection of the crankshaft 26 to the input shaft 30, when the speed of the vehicle, or a difference between the speeds of the pump and turbine impellers 28, 32, for example, exceeds a predetermined value. In this case, the fluid is fed into the engaging chamber 33 while the fluid in the releasing chamber 5 is discharged. When the vehicle speed or speed difference indicated above falls below the predetermined value, on the other hand, the lock-up clutch 36 is disengaged or released such that the fluid is fed into the releasing chamber 35 and discharged from the engaging chamber 33.

The CVT 14 has a pair of variable-diameter pulleys 40, 42 having a same diameter which are provided on the input shaft 30 and an output shaft 38, respectively. These pulleys 40, 42 are connected by a transmission belt 44, and have respective stationary rotors 46, 48 fixed to the respective input and output shafts 30, 38, and respective axially movable rotors 50, 52 which are axially movable on the respective shafts 30, 38 and rotated with these shafts. The movable rotors 50, 52 are moved by respective first and second hydraulic actuators in the form of first and second hydraulic cylinders 54, 56, whereby the effective widths of V grooves of the pulleys 40, 42, i.e., the effective diameters engaging the belt 44 are changed, to change a speed ratio "r" of the CVT 14 (Nin/Nout, where Nin=speed of the input shaft 30, and Nout =speed of the output shaft 38).

Since the variable-diameter pulleys 40, 42 have the same diameter, the corresponding first and second hydraulic cylinders 54, 56 have a same pressure-receiving area. Generally, the tension of the transmission belt 44 is determined primarily by the pressure in one (hereinafter referred to as "driven side cylinder") of the first and second hydraulic cylinders 54, 56 which corresponds to the driven one of the pulleys 40, 42 (hereinafter referred to as "driven side pulley"). The driven side cylinder 54 or 56 is supplied with a second line pressure Pl2 which is adjusted by a second pressure regulating valve 102 (which will be described), whereby the tension of the belt 44 is adjusted to within an optimum range in which the belt 44 does not slip on the pulleys 40, 42.

The reversing device 16 is a well known double-pinion type planetary gear mechanism, which includes: a carrier 60 fixed on an output shaft 58; a pair of planetary gears 62, 64 which are rotatably supported by the carrier 60 and which mesh with each other; a sun gear 66 which is fixed on the input shaft 38 (output shaft of the CVT 14) and which meshes with the inner planetary gear 62; a ring gear 68 meshing with the outer planetary gear 64; a REVERSE brake 70 for stopping the rotation of the ring gear 68; and a FORWARD clutch 72 for connecting the carrier 60 and the input shaft 38.

The REVERSE brake 70 and FORWARD) clutch 72 are hydraulically operated, frictionally coupling devices. The reversing device 16 is placed in a neutral position thereof when the brake 70 and the clutch 72 are both in the disengaged or released positions. In this state, the reversing device 16 does not transmit power to the intermediate gear device 18. When the FORWARD clutch 72 is engaged, the output shaft 38 (input shaft of the device 16) of the CVT 14 and the output shaft 58 of the device 16 are connected to each other, whereby power is transmitted from the CVT 14 to the intermediate gear device 18, so as to run the vehicle in the forward direction. When the REVERSE brake 70 is engaged, on the other hand, the direction of rotation of the output shaft 58 of the reversing device 16 is reversed with respect to the direction of rotation of the output shaft 38 of the CVT 14, whereby power is transmitted so as to run the vehicle in the reverse direction.

Figure 2:
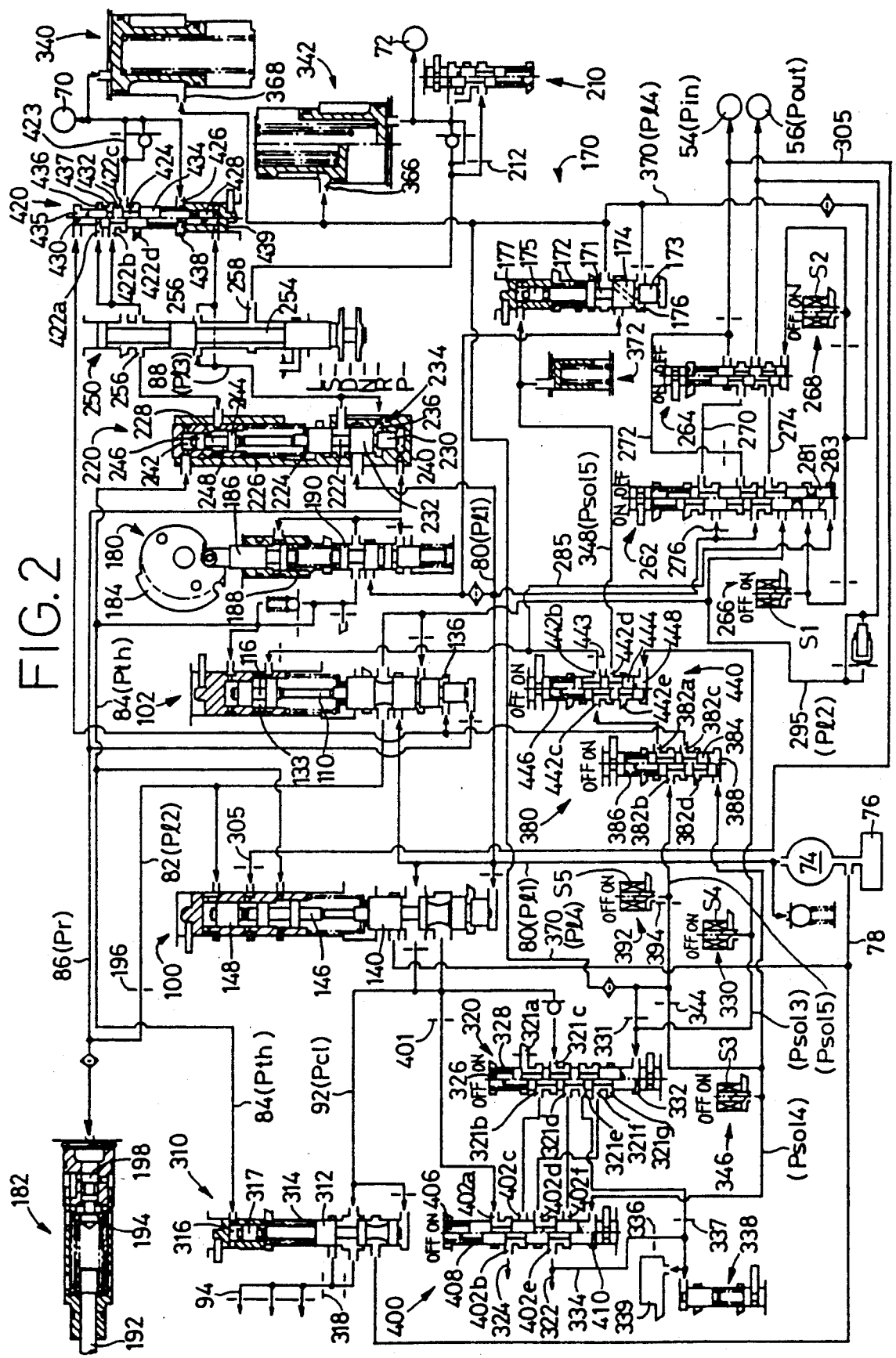
FIG. 2 is a hydraulic circuit diagram showing the hydraulic control apparatus adapted to control the power transmitting system FIG. 1.

Referring next to FIG. 2 showing a hydraulic control circuit for controlling the vehicle power transmitting system of FIG. 1, reference numeral 74 designates an oil pump serving as a hydraulic power source of the hydraulic system, which constitutes a part of a hydraulic control apparatus constructed according to the instant embodiment of the present invention, which will be described. The oil pump 74 is connected to the pump impeller 28 of the fluid coupling 12, whereby the pump 74 is always rotated with the crankshaft 26 of the engine 10. In operation, the pump 74 pumps up a working fluid through a strainer 76 from a reservoir to which the fluid is returned. The pump 74 also communicates with a return line 78, so that the fluid returned through the return line 78 is sucked into the pump 74. The pressurized fluid produced by the pump 74 is delivered as a first line pressure Pl1 into a first pressure line 80. In the present embodiment, the first line pressure Pl1 is regulated by an overflow or relief type first pressure regulating valve 100, which discharges the fluid in the first pressure line 80 into the return line 78 and a lock-up clutch line 92. The first line pressure Pl1 is lowered by the above-indicated second pressure regulating valve 102, to produce the above-indicated second line pressure Pl2 in a second pressure line 82. The second pressure regulating valve 102 is of a pressure reducing type, contrary to the overflow type of the first pressure regulating valve 100. The second line pressure Pl2 is adjusted to control the tension of the belt 44, i.e., used as a pressure for controlling the tension of the belt 44.

Figure 3:
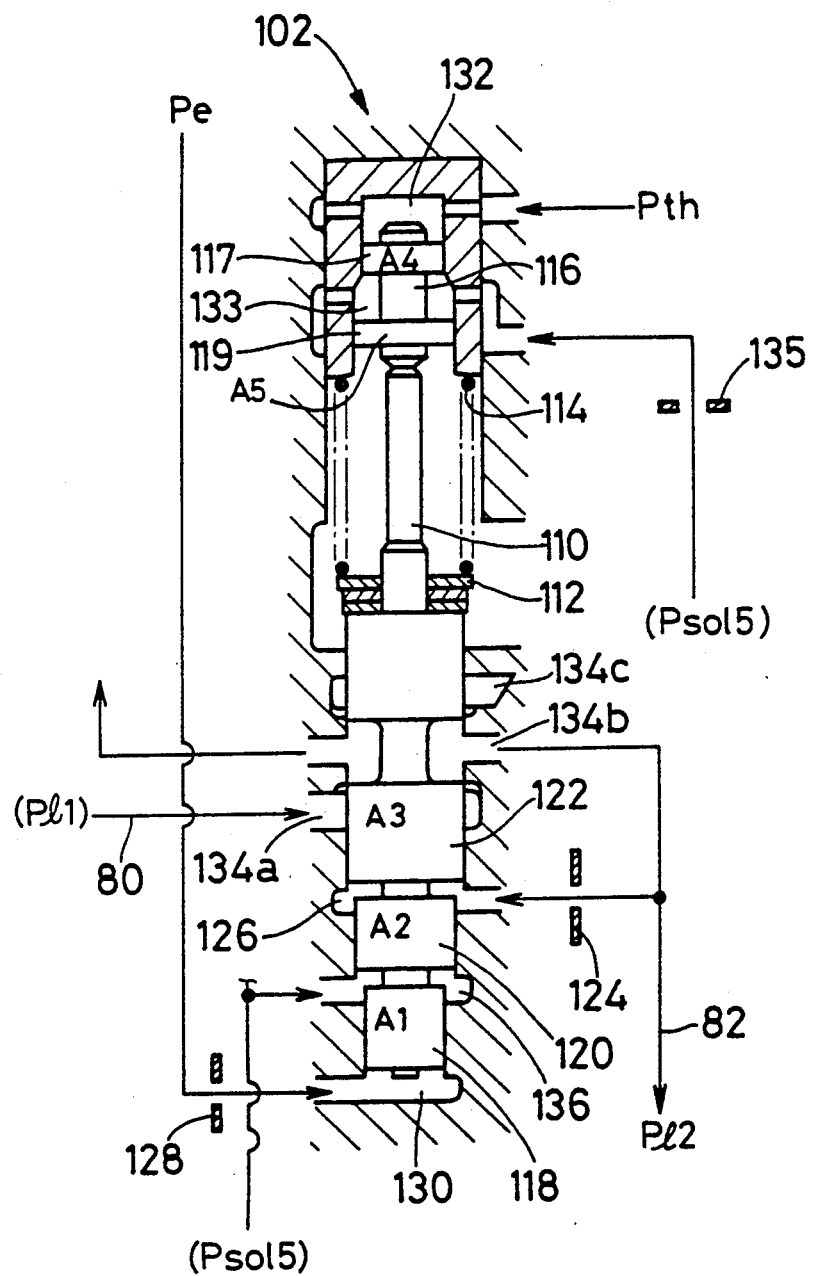
FIG. 3 is a view illustrating in detail a second pressure regulating valve incorporated in the apparatus of FIG. 2.

The second pressure regulating valve 102 will be first described in detail, by reference to FIG. 3.

This pressure regulating valve 102 includes a valve spool 110 for effecting connection and disconnection of the first pressure line 80 to and from the second pressure line 82, a spring sheet 112, a return spring 114, and a plunger 116. The valve spool 110 is provided at one axial end portion thereof remote from the plunger 116, with a first, a second and a third land 118, 120 and 122, which have different diameters. The first land 118 at the extreme end of the spool 110 has the smallest diameter, while the axially innermost third land 118 has the larger diameter. Between the second and third lands 120, 122, there is formed a chamber 126 to which is applied as a feedback pressure the second line pressure Pl2 through a flow restrictor 124, so that the valve spool 110 is biased toward its closed position by the second line pressure Pl2. Another chamber 130 is formed adjacent to the first land 118 at the above-indicated one end of the valve spool 110. To this chamber 130, there is applied a SPEED-RATIO pressure Pr (which will be described) through a flow restrictor 128. This pressure Pr also biases the valve spool 110 toward the closed position. The return spring 114 disposed around the valve spool 110 biases the spool 110 toward its open position, through the spring sheet 112.

The plunger 116 has a fourth land 117 at the other end thereof. This fourth land 117 partially defines another chamber 132. This chamber 132 is adapted to receive a THROTTLE pressure Pth (which will be described) which biases the spool 110 toward its open position.

The plunger 116 also has a fifth land 119 having a diameter slightly larger than the fourth land 117. The fifth land 119 is located near the fourth land 117, and cooperates with the fourth land 117 to define a further chamber 133.

The valve spool 110 is positioned under equilibrium of forces according to the following equation (1):

$$Pl2 = (A4 \cdot Pth + W - A1 \cdot Pr)/(A3 - A2) \quad (1)$$

where,

A1: pressure-receiving area of the first land 118
A2: cross sectional area of the second land 120
A3: cross sectional area of the third land 122
A4: cross sectional area of the fourth land 117
W: biasing force of the return spring 114

Figure 7:
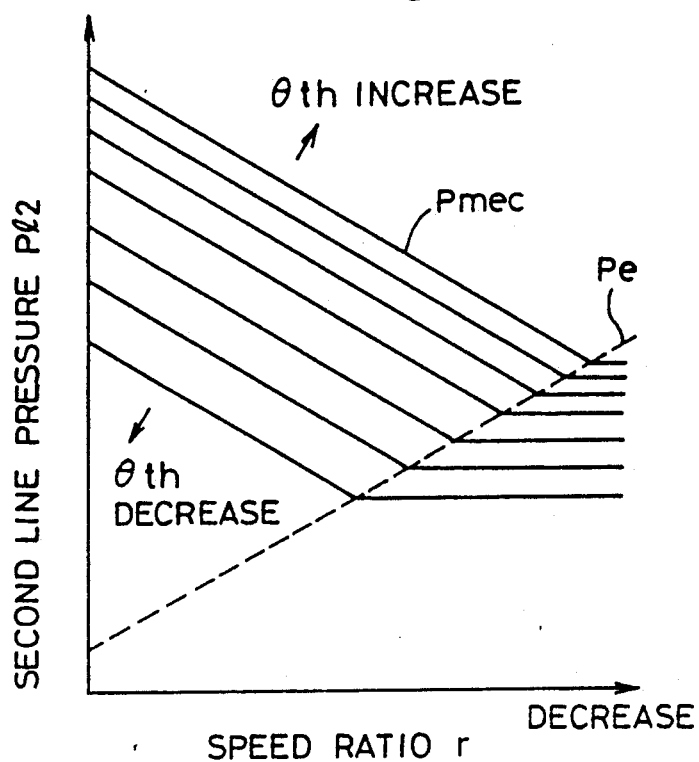
FIG. 7 is a graph showing an output characteristic of the second pressure regulating valve of FIG. 3.

Namely, the valve spool 110 is axially moved according to the equation (1), so as to repeatedly alternately establish communication between a port 134a and a port 134b for permitting a flow of the fluid from the first pressure line 80 into the second pressure line 82, and communication between the port 134b and a drain port 134c for draining the second pressure line 82 through the drain port 134c. As a result, the second line pressure Pl2 is produced. Since the second pressure line 82 is a closed hydraulic circuit, the second line pressure Pl2 can be adjusted by the second pressure regulating valve 102, by lowering the relatively high first line pressure Pl1, as indicated in FIG. 7.

Between the first and second lands 118, 120 of the valve spool 110 of the second pressure regulating valve 102, there is formed a chamber 136 adapted to receive a pilot pressure Psol5 through a second line pressure reducing control valve 380 which will be described. As the valve spool 110 is biased toward its closed position by the pilot pressure Psol5 applied to the chamber 136, the second line pressure Pl2 is accordingly reduced. The pilot pressure Psol5 is also applied to the chamber 133 between the fourth and fifth lands 117, 119, through a second relay valve 440 (which will be described) and a flow restrictor 135. As the valve spool 110 is biased toward its open position by the pilot pressure Psol5 applied to the chamber 133, the second line pressure Pl2 is accordingly increased. Thus, the chamber 133 is used to regulate the second line pressure Pl2 for the purpose of controlling the tension of the belt 44. The reduction and increase in the second line pressure will be described later in more detail.

Figure 4:
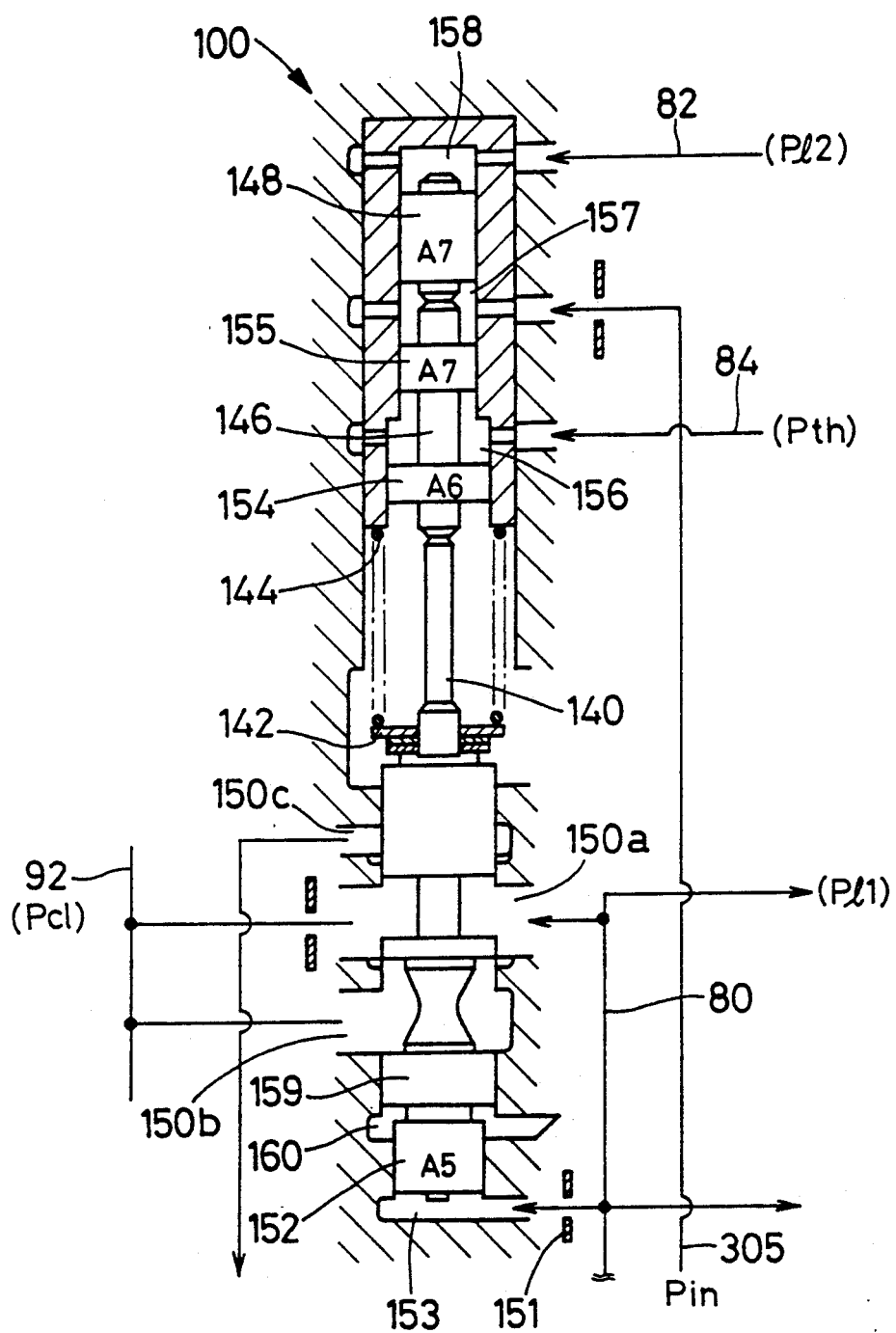
FIG. 4 is a view illustrating in detail a first pressure regulating valve also incorporated in the apparatus of FIG. 2.

Referring next to FIG. 4, the first pressure regulating valve 100 will then be described. This valve 100 includes a valve spool 140, a spring sheet 142, a return spring 144, a first plunger 146, and a second plunger 148 whose diameter is the same as a second land 155 of the first plunger 146. The valve spool 140 is operated to effect selective connection and disconnection of a port 150a communicating with the first pressure line 80, to and from a drain port 150b or 150c. The valve spool 140 has a first land 152 at one axial end thereof remote from the first and second plungers 146, 148. Adjacent to the first land 152 of the spool 140, there is formed a chamber 153 which receives as a feedback pressure the first line pressure Pl1 through a flow restrictor 151. The valve spool 140 is biased toward its open position by this first line pressure Pl1. The first plunger 146, which is coaxial with the valve spool 140, has a first land 154 which cooperates with the above-indicated second land 155 to define a chamber 156 adapted to receive the THROTTLE pressure Pth. Between the second land 155 of the first plunger 146 and the second plunger 148, there is formed a chamber 157 adapted to receive a pressure Pin in the first hydraulic cylinder 54, through a branch line 305. Further, a chamber 158 is formed adjacent to the end face of the second plunger 148. The chamber 158 receives the second line pressure Pl2. The biasing force of the above-indicated return spring 144 acts on the valve spool 140 through the valve sheet 142 so as to bias the spool 140 toward its closed position. The valve spool 140 is positioned under equilibrium of forces according to the following equation (2):

$$Pl1 = [(Pin \text{ or } Pl2).A7 + Pth)A6 - A7) + W]/A5 \quad (2)$$

where,

A5: pressure-receiving area of the first land 152 of the valve spool 140

A6: cross sectional area of the first land 154 of the first plunger 146

A7: cross sectional area of the second land 155 of the first plunger 146 (second plunger 148)

W: biasing force of the return spring 144

In the first pressure regulating valve 100, the first and second plungers 146, 148 are separated from each other and a thrust due to the pressure Pin in the first cylinder 54 acts on the valve spool 140 in the direction toward the closed position, when the pressure Pin is higher than the second line pressure Pl2 (which is normally equal to the pressure Pout in the second cylinder 56). When the pressure Pin is lower than the second line pressure Pl2, the first and second plungers 146, 148 are held in abutting contact with each other, whereby a thrust due to the second line pressure Pl2 acting on the end face of the second plunger 148 acts on the valve spool 140 in the direction toward its closed position. That is, the second plunger 148 receiving the pressure Pin and the second line pressure Pl2 applies to the spool 140 a force based on the higher one of the pressures Pin and Pl2, so that the spool 140 is biased toward its closed position. Between the first and second lands 152 and 159 of the valve spool 140 which is open to the drain.

Figure 5:
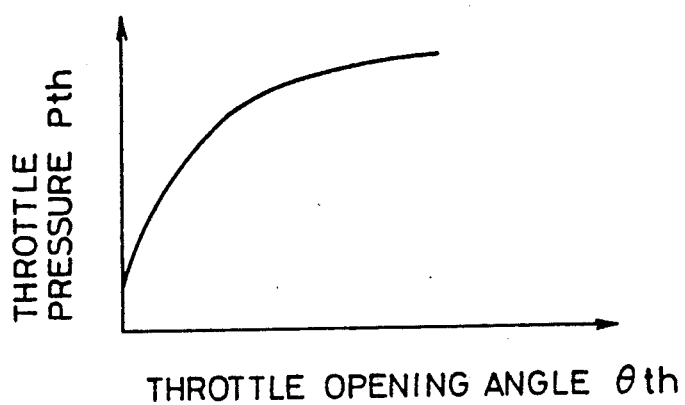
FIG. 5 is a graph indicating an output characteristic of a throttle sensing valve incorporated in the apparatus of FIG. 2.

Referring back to FIG. 2, the THROTTLE pressure Pth representing an actual opening angle θth of a throttle valve of the engine 10 is generated by a flow restrictor sensing valve 180. Further, the SPEED-RATIO pressure Pr representing an actual speed ratio "r" of the CVT 14 is generated by a speed-ratio sensing valve 182. Described specifically, the throttle sensing valve 180 includes: a cam 184 rotated as the throttle valve is operated; a plunger 186 which engages a cam surface of the cam 184 and which is axially moved by a distance corresponding to an angle of rotation of the cam 184; a spring 188; and a valve spool 190 which receives a thrust through the spring 188 from the plunger 186, and a thrust due to the first line pressure Pl1. These two thrust forces act on the spool 190 in the opposite directions. The valve spool 190 is moved to a position of equilibrium of the above two thrust forces, whereby the first line pressure Pl1 is reduced so as to produce the THROTTLE pressure Pth corresponding to the actual opening angle θth of the throttle valve. The relationship between the THROTTLE pressure Pth and the opening angle θth is indicated in the graph of FIG. 5. The THROTTLE pressure Pth is applied through a line 84 to the above-described first and second pressure regulating valves 100, 102, a third pressure regulating valve 220, and a lock-up pressure regulating valve 310.

Figure 6:
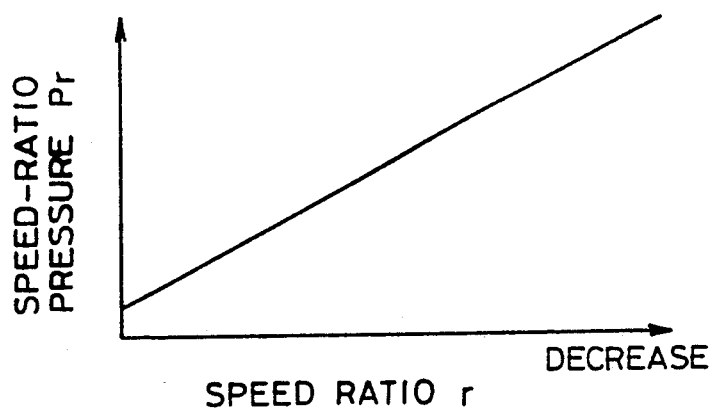
FIG. 6 is a graph indicating an output characteristic of a speed-ratio sensing valve incorporated in the apparatus of FIG. 2.

The speed-ratio sensing valve 182 includes: a sensing rod 192 which slidably contacts the axially movable rotor 50 on the input shaft 30 of the CVT 14 and which is axially displaced by a distance equal to an amount of axial movement of the movable rotor 50; a spring 194 whose biasing force varies as the axial position of the rod 192 is changed; and a valve spool 198 which receives the biasing force of the spring 194 and the second line pressure Pl2. The valve spool 196 is moved to a position of equilibrium of the biasing force of the spring 194 and a thrust force based on the second line pressure Pl2, whereby the amount of discharge flow of the fluid from the second pressure line 82 into the drain is adjusted depending upon the speed-ratio "e" of the CVT 14. For example, as the movable rotor 50 is moved toward the stationary rotor 46 so as to reduce the effective width of the V-groove of the pulley 40 and thereby decrease the speed ratio "r", the sensing rod 192 is moved in a direction to compress the spring 194, thereby reducing the rate of flow of the fluid which is supplied from the second pressure line 82 through an orifice 196 and discharged into the drain by a resulting movement of the valve spool 198. As a result, the pressure in a portion of the line 82 downstream of the orifice 196 is increased. This pressure is utilized as the SPEED-RATIO pressure Pr, which increases with a decrease in the speed ratio "r" of the CVT 14 (so as to increase the vehicle speed), as indicated in the graph of FIG. 6. The pressure Pr is applied through a line 86 to the second and third pressure regulating valves 102 and 220.

Figure 8:
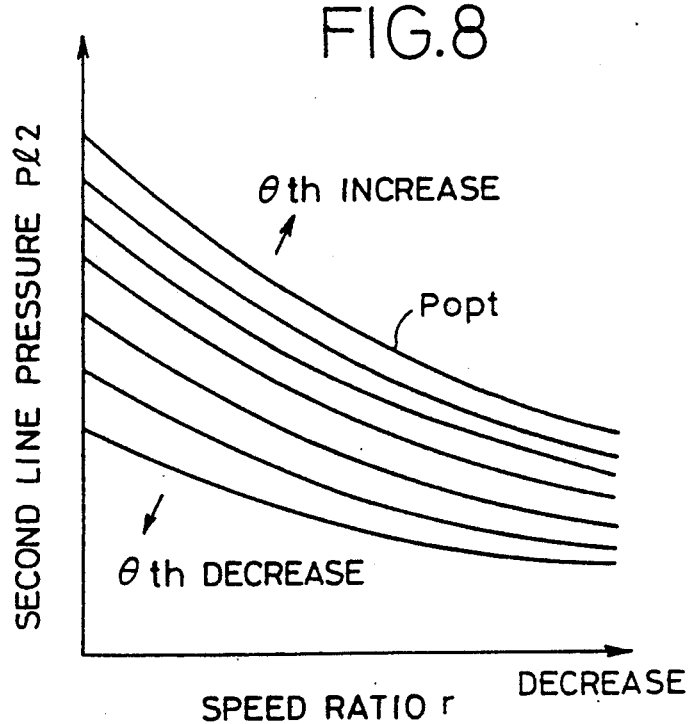
FIG. 8 is a graph showing an ideal relationship of a second line pressure of the apparatus of FIG. 2 with a speed ratio of a CVT of the power transmitting system and an opening angle of a throttle valve of the vehicle.

It will be understood from the above description of the speed-ratio sensing valve 182 that since the SPEED-RATIO pressure Pr is produced by changing the amount of discharge of the fluid supplied from the second pressure line 82 through the orifice 196, the pressure Pr will not exceed the second line pressure Pl2. Further, the second line pressure Pl2 is lowered with an increase in the pressure Pr, by the second pressure regulating valve 102 according to the equation (1) indicated above. Therefore, when the pressure Pr increases up to the level of the second line pressure Pl2, both of the pressures Pr and Pl2 are held constant, as indicated in the graph of FIG. 7, which shows that the lower limit of the second line pressure Pl2 adjusted by the second pressure regulating valve 102 is determined by the SPEED-RATIO pressure Pr, i.e., the speed ratio "r" of the CVT 14. Namely, the present hydraulic arrangement assures the curve of the second line pressure Pl2 (as indicated in FIG. 7) which is similar or approximate to an ideal curve (indicating an ideal pressure Popt) as shown in FIG. 8 that permits the tension of the belt 44 to be maintained at an optimum value. In other words, the present hydraulic arrangement does not require an electromagnetically operated pressure control servo valve for continuously controlling the second line pressure Pl2. In this respect, the present hydraulic control apparatus provides significant reduction in the cost of manufacture. The second line pressure Pl2 adjusted by the second pressure regulating valve 102 is a pressure Pmec (FIG. 7) which is influenced by the pressure-receiving areas of the spool 110 and plunger 116.

The third pressure regulating valve 220 is adapted to produce a third line pressure Pl3 suitable for operating the REVERSE brake 70 and FORWARD clutch 72 of the reversing device 16. This valve 220 includes a valve spool 222 for effecting selective connection and disconnection of the first pressure line 80 to and from a third pressure line 88, a spring sheet 224, a return spring 226, and a plunger 228. The valve spool 222 has a first and a second land 230, 232, between which is formed a chamber 236, which is adapted to receive the third line pressure Pl3 as a feedback pressure through a flow restrictor 234, so that the spool 222 is biased toward its closed position by the pressure Pl3. Adjacent to the first land 230 of the spool 222, there is formed another chamber 240 which receives the SPEED-RATIO pressure Pr, so that the spool 222 is biased toward the closed position by the pressure Pr. In the third pressure regulating valve 220, a biasing force of the return spring 226 acts on the spool 222 through the spring sheet 224, so that the spool 222 is biased toward its open position by the spring 226. Adjacent to the end face of the plunger 228, there is formed a chamber 242 adapted to receive the THROTTLE pressure Pth, so that the spool 222 is biased toward the open position by the pressure Pth. The plunger 228 has a first land 244, and a second land 246 having a smaller diameter than the first land 244. Between these first and second lands 244, 246, there is formed a chamber 248 adapted to receive the third line pressure Pl3 only when the vehicle runs in the reverse direction with the REVERSE brake 70 placed in the engaged position. In the third pressure regulating valve 220 constructed as described above, the valve spool 222 is moved to a position of equilibrium of forces according to an equation similar to the equation (1), so that the third line pressure Pl3 is controlled to an optimum level based on the SPEED-RATIO and THROTTLE pressures Pr and Pth. The optimum level is a permissible lowest value required to permit the reversing device 16 to transmit received input torque without slipping of the brake 70 or clutch 72.

When the REVERSE brake 70 is placed in the engaged position, the third line pressure Pl3 is applied to the chamber 248, whereby the force biasing the spool 222 toward the open position is increased, to thereby increase the third line pressure Pl3. This arrangement assures optimum torque transmitting capacity of the FORWARD clutch 72 and REVERSE brake 70 during engagement of the clutch 72 or brake 70 to run the vehicle in the forward or reverse direction.

The thus regulated third line pressure Pl3 is applied to the FORWARD clutch 72 or REVERSE brake 70 by means of a shift lever valve 250. This shift lever valve 250 has a valve spool 254 which is moved in response to an operation of the shift lever 252, which has six operating positions, i.e., NEUTRAL "N", PARKING "P", LOW "L", SECOND "S", DRIVE "D" and REVERSE "R". The shift lever valve 250 has an output port 256 and an output port 258. When the shift lever 252 is placed in one of the forward-drive positions LOW, SECOND and DRIVE positions "L", "S" and "D", the third line pressure Pl3 is supplied primarily through the output port 258 to the FORWARD clutch 72, while at the same time the fluid is discharged from the brake 70. When the shift lever 252 is placed in the REVERSE position "R", the third line pressure Pl3 is supplied through the output port 256 to the ports 422a, 422b of a REVERSE INHIBIT valve 420 and to the REVERSE clutch 72 through the valve 420, while at the same time the fluid is discharged from the FORWARD brake 70. When the shift lever 252 is placed in the NEUTRAL position "N" or PARKING position "P", the fluid is discharged from the brake 70 and clutch 72 at the same time.

Accumulators 340 and 342 are connected to the brake 70 and clutch 72, respectively, for the purpose of slowly raising the pressure applied to the brake and clutch 70, 72, so that the frictionally coupling devices of the brake and clutch may be smoothly engaged. A shift timing valve 210 connected to the clutch 72 functions to prevent a transient excessively high rate of flow of the fluid to the clutch 72, such that a flow restrictor 212 is closed with a rise in the pressure in the cylinder of the clutch 72.

The first and second line pressures Pl1 and Pl2 adjusted by the first and second pressure regulating valves 100, 102, respectively, are applied to the one and the other of the first and second hydraulic cylinders 54, 56 of the CVT 14 through a shift control valve assembly 260, for controlling the speed ratio "r" of the CVT 14. The shift control valve assembly 260 has a directional control valve 262 and a flow control valve 264. These control valves 262, 264 receive through a fourth pressure line 370 a fourth line pressure Pl4 which is produced by a fourth pressure regulating valve 170 based on the first line pressure Pl1.

The fourth pressure regulating valve 170 includes a valve spool 171 for connection and disconnection between the first pressure line 80 and the fourth pressure line 370, and a spring 172 for biasing the spool 171 toward its open position. Between a first and a second land 173, 174 of the spool 171, there is formed a chamber 176 which receives a fourth line pressure Pl4 as the feedback pressure. The spool 171 also has a third land 175 at the end remote from the first land 173. The third land 175 partially defines a chamber 177 which receives a pilot pressure Psol5 (which will be described) which acts to bias the spool 171 toward its open position. The end face of the first land 173 is exposed to the atmosphere. In the thus constructed fourth pressure regulating valve 170, the valve spool 171 is positioned for equilibrium between the valve closing biasing force based on the fourth line pressure Pl4 and the valve opening biasing force based on the pilot pressure Psol4. As a result, the fourth line pressure Pl4 is adjusted according to the pilot pressure Psol5, as described below.

Figure 9:
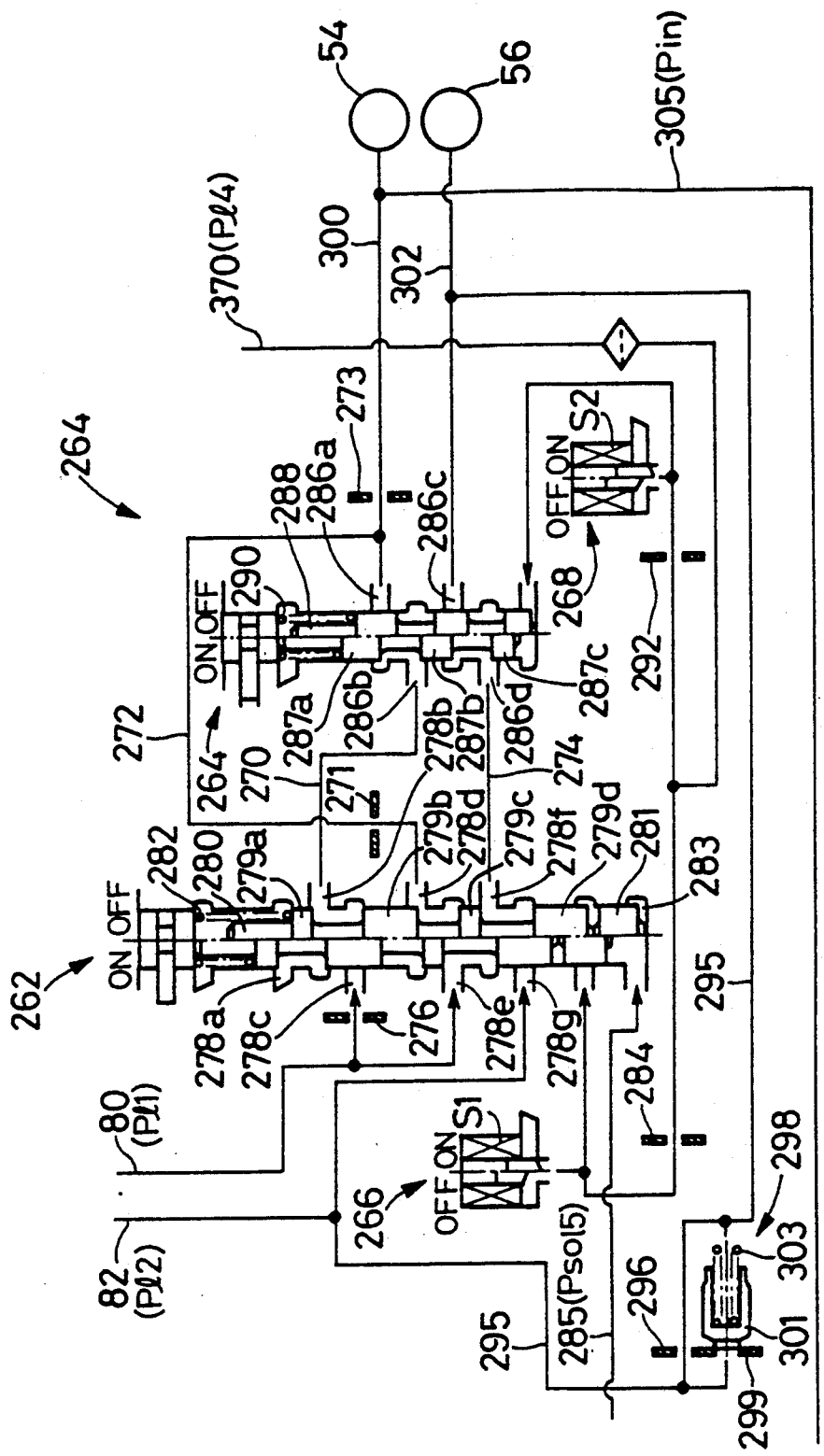
FIG. 9 is a view illustrating in detail a shift control valve assembly of the apparatus of FIG. 2.

Referring to FIG. 9 which shows the details of the shift control valve assembly 260, the directional control valve 262 is a spool valve controlled by a first solenoid-operated valve 266. The valve 262 has a 278a connected to the drain, and ports 278b, 278d and 278f which communicate with respective first, second and third connecting lines 270, 272 and 274, respectively. The connecting line 272 is provided with a flow restrictor 271. The directional control valve 262 further has a port 278c receiving the first line pressure Pl1 through a flow restrictor 276, a port 278e receiving the first line pressure Pl1, and a port 278g receiving the second line pressure Pl2. The valve 262 includes a valve spool 280 which is axially slidably movable between a shift-down position (indicated at ON in FIG. 9) corresponding to one end (upper end as viewed in FIG. 9) of an operating stroke thereof, and a shift-up position (indicated at OFF in FIG. 9) corresponding to the other end (lower end as viewed in FIG. 9) of the operating stroke. The spool 280 is biased by a spring 282 toward its shift-up position.

The valve spool 280 has four lands 279a, 279b, 279c and 279d which open and close the above-indicated ports of the valve 262. The upper end of the spool 280 on the side of the spring 282 is exposed to the atmosphere. On the other hand, the lower end of the spool 280 is exposed to the fourth line pressure Pl4 when the first solenoid-operated valve 266 is placed in the ON or closed position. With the valve 266 placed in the OFF or open position, however, the fourth line pressure Pl4 is released through the valve 266 located downstream of a flow restrictor 284, whereby the fourth line pressure Pl4 is not applied to the lower end of the valve spool 280. While the first solenoid valve 266 is ON (indicated at ON in FIG. 9), the valve spool 280 is placed in the shift-down position (indicated at ON in FIG. 9). While the valve 266 is OFF (indicated at OFF in FIG. 9), the spool 280 is placed in the shift-up position (indicated at OFF in FIG. 9). In this arrangement, while the spool 280 is placed in its shift-down position with the valve 266 being held ON, the ports 278a and 278b are connected to each other and the ports 278e and 278f are connected to each other, while the ports 278b and 278c are disconnected from each other, the ports 278d and 278e are disconnected from each other, and the ports 278f and 278g are disconnected from each other. While the spool 280 is placed in the shift-up position with the valve 266 being held OFF, the connecting and disconnecting states of the ports 278a–278g are reversed with respect to those in the shift-down position.

The directional control valve 262 is provided with a plunger 281 disposed coaxially with the spool 280, for abutting contact with the end face of the spool 280 remote from the 282, and a shift-down chamber 283 which is partially defined by the plunger 281. The shift-down chamber 283 is adapted to receive the pilot pressure Psol5 produced by a fifth solenoid-operated valve 392, so that the pilot pressure Psol5 acts on the spool 280 in the direction toward the shift-down position. The pilot pressure Psol5 is applied to the shift-down chamber 283 through a line 285, which is also connected to the chamber 133 of the second pressure regulating valve 102. The pilot pressure Psol applied to the shift-down chamber 283 functions to move the spool 280 to the shift-down position, in the event of a trouble with the first and/or second solenoid-operated valve(s) 266, 268, as described below.

The flow control valve 264 of the shift control valve assembly 260 is a spool valve which is controlled by a second solenoid-operated valve 268, and functions as a valve for changing the speed or rate at which the CVT 14 is shifted. The valve 264 has a port 286a which communicates with the first hydraulic cylinder 54 through a first cylinder line 300 and with the second connecting line 272, ports 286b and 286d communicating with the first and third connecting lines 270, 274, respectively, and a port 286c which communicate with the second hydraulic cylinder 56 through a second cylinder line 302. The valve 264 includes a valve spool 288 which is axially slidably movable between a non-restricting position on the side of one end (upper end as viewed in FIG. 9) of an operating stroke thereof, and a flow-restricting position on the side of the other end (lower end as viewed in FIG. 9) of the operating stroke. The spool 288 is biased by a spring 290 toward its flow-restricting position.

The valve spool 288 has three lands 287a, 287b and 287c which open and close the above-indicated ports of the valve 264. As in the valve 262, the upper end of the spool 288 on the side of the spring 290 is exposed to the atmospheric pressure, with no hydraulic pressure applied thereto. On the other hand, the lower end of the spool 288 is exposed to the fourth line pressure Pl4 adjusted by the fourth pressure regulating valve 170 when the second solenoid-operated valve 268 is placed in the ON or closed position. With the valve 268 placed in the OFF or open position, however, the fourth line pressure Pl4 is released through the valve 268 located downstream of a flow restrictor 292, whereby the fourth line pressure Pl4 is not applied to the lower end of the valve spool 288. While the second solenoid valve 268 is ON (indicated at OFF in FIG. 9), the valve spool 288 is placed in the non-restricting position (indicated at ON in FIG. 9). While the valve 268 is OFF (indicated at OFF in FIG. 9), the spool 288 is placed in the flow-restricting position (indicated at OFF in FIG. 9). In this arrangement, while the second solenoid-operated valve 268 is ON (with the duty cycle set at 100%, the spool 288 is placed in its non-restriction position. In this state, the ports 268a and 286b are connected to each other and the ports 286c and 286d are connected to each other. While the solenoid-operated valve 288 is OFF (with the duty cycle set at 0%), the spool 288 is placed in the flow-restricting position, whereby the ports 286a and 286b are disconnected and the ports 286c and 286d are disconnected.

It will be understood that the fourth pressure regulating valve 170 functions as means for producing the fourth line pressure Pl4 which is used as a pressure for actuating the directional and flow control valves 262, 264 through the respective first and second solenoid-operated valves 266, 268.

The second hydraulic cylinder 56 communicates with the second pressure line 82 through a by-pass line 295 in which a flow restrictor 296 and a check valve 298 are connected in parallel. This check valve 298 is provided to prevent a rapid decrease in the pressure Pout (=Pl1) in the second hydraulic cylinder 56 with the fluid being discharged from the cylinder 56 into the second pressure line 82, when the first line pressure Pl1 is applied to the cylinder 56, during a shift-down operation of the CVT 14 which requires the pressure Pout to be higher than the pressure Pin in the first cylinder 54, or during an engine-braking operation in which torque is transmitted in the direction from the output shaft 38 of the CVT 14 to the input shaft 30.

The flow restrictor 296 and the check valve 298 prevent or minimize a phenomenon of pulsation of the pressure Pout in the second cylinder 56 which would occur in synchronization with the duty cycling operation of the flow control valve 264. Described more specifically, the upper peak of the spike of the pressure Pout is released through the flow restrictor 296, while the lower peak of the pressure Pout is compensated for by the check valve 298. The check valve 298 includes a valve seat 299 having a flat seat surface, a valve member 301 having a flat operating surface which is abuttable on the valve seat 299, and a spring 303 for biasing the valve member 301 against the seat 299. This check valve 298 is adapted to be opened when a pressure difference across the valve exceeds about $0.2 kg/cm^2$.

The first cylinder line 300 has a second flow restrictor 273 disposed between the point of connection with the second connecting line 272 and the point of connection with a branch line 305 leading to the first pressure regulating valve 100. This second flow restrictor 273 determines the rapid shift-down speed of the CVT 14, such that the shift-down speed is a maximum value that assures a non-slipping operation of the transmission belt 44. The first flow restrictor 271 and the flow restrictor 296 in the by-pass line 295 determine the slow shift-up speed of the CVT 14, while the flow restrictor 276 associated with the port 278c of the directional control valve 262 determines the rapid shift-up speed of the CVT 14.

When the first solenoid-operated valve 266 is turned ON, the speed ratio "r" of the CVT 14 is increased to reduce the speed of the vehicle, irrespective of the operating state of the second solenoid-operated valve 268. When the second solenoid-operated valve 268 is turned ON with the first solenoid-operated valve 266 held ON, the fluid in the first pressure line 80 is fed into the second cylinder 56 through the ports 278e and 278f, third connecting line 274, ports 286d and 286c and second cylinder line 302. At the same time, the fluid in the first cylinder 54 is discharged into the drain through the first cylinder line 300, ports 286a and 286b, first connecting line 270, port 278b and drain port 278a. That is, the CVT 14 is operated in a rapid shift-down mode I as indicated in FIG. 10, so that the speed ratio "r" of the CVT 14 is rapidly increased so as to lower the running speed of the vehicle.

When the second solenoid-operated valve 268 is turned OFF while the first solenoid-operated valve 266 is placed in the ON position, the fluid in the second pressure line 82 is fed into the second cylinder 56 through the by-pass line 295 (incorporating the parallel connection of the flow restrictor 296 and check valve 298), while the fluid in the first cylinder 54 is discharged through a small clearance which is purposely or inherently formed or provided between the piston and the mating sliding surface of the cylinder 54. That is, the CVT 14 is operated in a slow shift-down mode III as indicated in FIG. 10, so that the speed ratio "r" of the CVT 14 is slowly increased.

Figure 10:
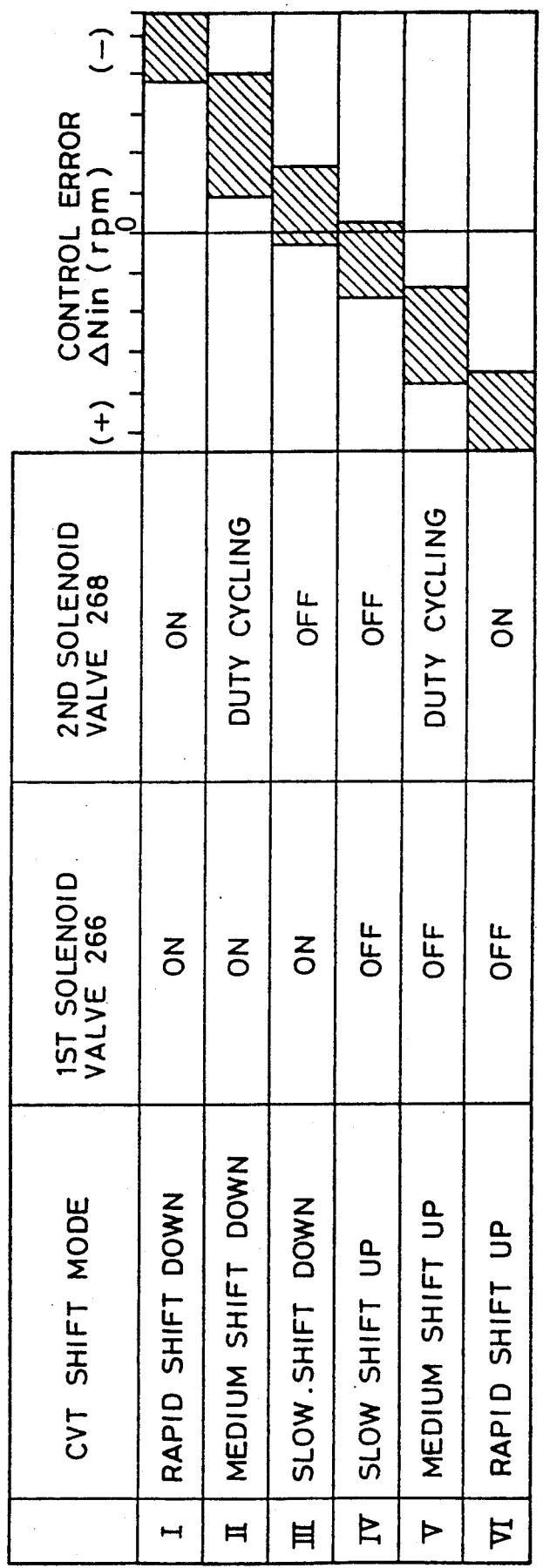
FIG. 10 is a view indicating a relationship between on-off states of a first and a second solenoid valve of the valve assembly of FIG. 9 and a shifting mode of the CVT.

When the second solenoid-operated valve 288 is alternately turned ON and OFF at the controlled duty cycle while the first solenoid-operated valve 266 is ON, the CVT 14 is operated in a medium shift-down mode II as indicated in FIG. 10, so that the CVT 14 is shifted down at a rate intermediate between the shift-down rates in the rapid and slow shift-down modes I and III. In this medium shift-down mode II, the shift-down rate is determined by the duty cycle of the valve 268.

When the first solenoid-operated valve 266 is turned OFF, the speed ratio "r" of the CVT 14 is decreased so as to increase the vehicle running speed, irrespective of the operating state of the second solenoid-operated valve 268. When the second solenoid-operated valve 268 is turned ON while the first solenoid-operated valve 266 is OFF, the fluid in the first pressure line 80 is fed into the first cylinder 54 through the flow restrictor 276, ports 278c and 278b, first connecting line 270, ports 286b and 286a and first cylinder line 300, and also through the ports 278e and 278d, second connecting line 272 and first cylinder line 300. At the same time, the fluid in the second cylinder 56 is discharged into the second pressure line 82 through the second cylinder line 302, ports 286c and 286d, third connecting line, and ports 278f and 278g. Namely, the CVT 14 is operated in a rapid shift-up mode VI as indicated in FIG. 10, so that the speed ratio "r" is rapidly reduced.

When the second solenoid-operated valve 268 is turned OFF while the first solenoid-operated valve 266 is OFF, the first connecting line 270 is closed by the flow control valve 264. As a result, the fluid in the first pressure line 80 is fed into the first cylinder 54 primarily through the second connecting line 272 provided with the first flow restrictor 271. At the same time, the fluid in the second cylinder 56 is slowly discharged into the second pressure line 82 through the flow restrictor 296. Namely, the CVT 14 is operated in a slow shift-up mode IV as indicated in FIG. 10, so that the speed ratio "r" is slowly reduced, due to the flow restrictors 271 and 296.

When the second solenoid-operated valve 268 is alternately turned ON and OFF at the controlled duty cycle while the first solenoid-operated valve 266 is OFF, the CVT 14 is operated in a medium shift-up mode as indicated in FIG. 10, so that the speed ratio "r" is reduced at a rate intermediate between the rates in the slow and rapid shift-up modes IV and VI.

Figure 11:
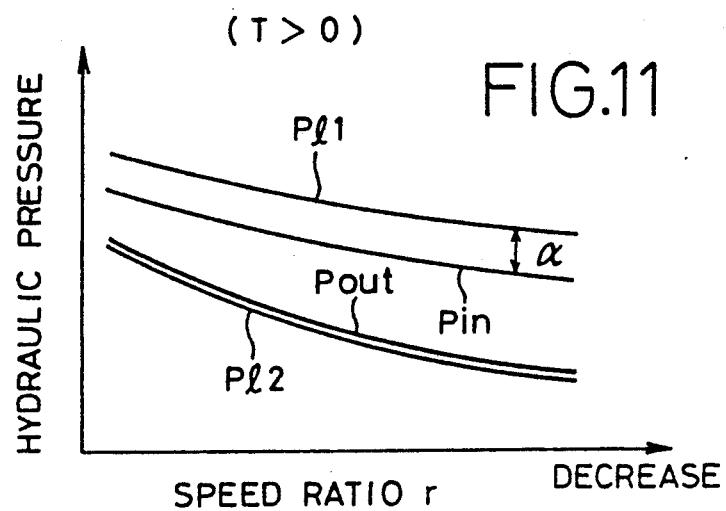
FIGS. 11, 12 and 13 are graphs indicating relationships between the speed ratio of the CVT and hydraulic pressures at different locations of the apparatus of FIG. 2, where the vehicle is running in normal, engine-brake and non-load running conditions, respectively.
Figure 12:
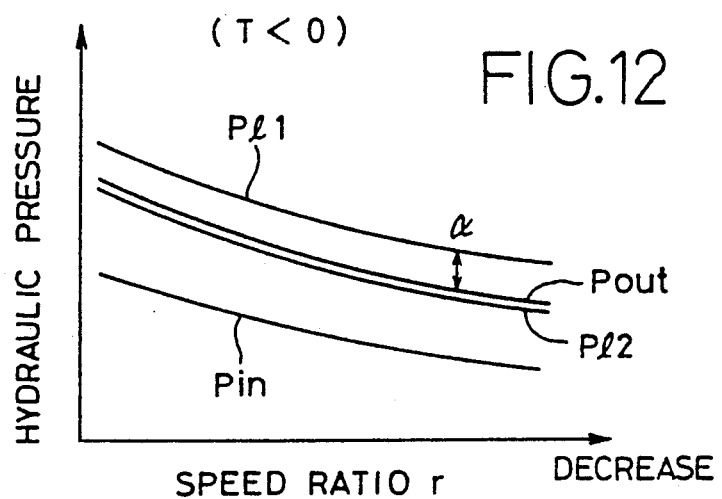
Figure 13:
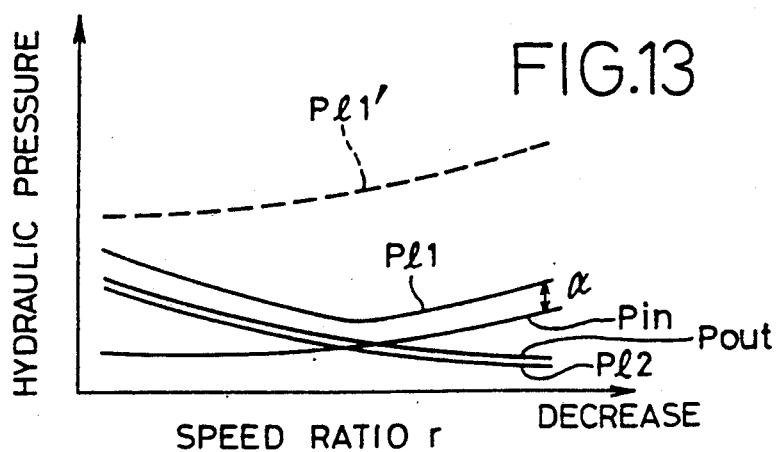

In the CVT 14, it is desirable that the first line pressure Pl1 have an optimum value with respect to the second line pressure Pl2 and the cylinder pressures Pin and Pout, as indicated in FIG. 11 when torque T is transmitted through the CVT 14 in the forward direction from the input shaft 30 toward the output shaft 38 (when the torque T is positive), and as indicated in FIG. 12 when the torque T is transmitted in the reverse direction from the output shaft 30 toward the input shaft 30 as in an engine-brake running of the vehicle (when the torque T is negative). The optimum value of the first line pressure Pl1 as shown in FIGS. 10 and 11 varies with the speed ratio "r" of the CVT 14, with the torque of the input shaft 30 is constant at a given level. In the present embodiment wherein the first and second hydraulic cylinders 54, 56 have the same pressure-receiving area, the pressure Pin in the first cylinder 54 is higher than the pressure Pout in the second cylinder 56 during the positive-torque running of the vehicle, as indicated in FIG. 11. On the other hand, the pressure Pout is higher than the pressure Pin during the negative-torque running (engine-brake running) of the vehicle, as indicated in FIG. 12. That is, the pressure in the driving side cylinder 54, 56 is higher than the pressure in the driven side cylinder 54, 56. In the positive-torque running of FIG. 11, the pressure Pin in the driving side cylinder 54 provides a thrust which determines the speed ratio "r" of the CVT 14. In view of this, the first line pressure Pl1 is desirably adjusted so as to be higher than the pressure Pin by an extra amount $\alpha$ which is a minimum value required to establish the desired speed ratio "r" with a minimum power loss. However, it is impossible to adjust the first line pressure Pl1 based on one of the pressures Pin and Pout of the two cylinders 54, 56. In view of this, the first pressure regulating valve 100 is provided with the second plunger 148, so that the valve spool 140 of the valve 100 receives a biasing force based on a higher one of the pressure Pin and the second line pressure Pl2. According to this arrangement, the first line pressure Pl1 is determined based on the higher one of the pressures Pin and Pl2 whose curves intersect each other as indicated in FIG. 13, i.e., based on the higher pressure Pin or Pl2 while the vehicle is running with no load applied to the CVT 14. More precisely, the optimum first line pressure Pl1 is determined by adding the above-indicated required minimum extra value $\alpha$, so that the first line pressure Pl1 is a minimum level required to obtain the desired speed ratio "r" with a minimum power loss. A curve indicated in broken line in FIG. 13 represents the first line pressure Pl1' where the first pressure regulating valve 100 is not provided with the second plunger 148. This curve indicates that the first line pressure Pl1' is unnecessarily high when the desired speed ratio "r" is relatively low.

As indicated above, the extra value $\alpha$ is a minimum value which is required to change the speed ratio "r" of the CVT 14 over its entire range available. It will be understood from the above equation (2) that the first line pressure Pl1 increases in relation to the THROT- TLE pressure Pth, since the pressure-receiving areas of the relevant elements of the first pressure regulating valve 100 and the biasing force of the spring 144 are so determined. Although the first line pressure Pl1 adjusted by the first pressure regulating valve 100 increases with the pressure Pin or Pl2 and the THROTTLE pressure Pth, the pressure Pl1 is saturated at a highest value which varies with the THROTTLE pressure Pth ($\theta$th), as indicated in FIG. 14. This arrangement prevents an excessive rise in the first line pressure Pl1 (higher than the pressure Pin in the first cylinder 54 by the extra value $\alpha$), even if the pressure Pin increases while the speed ratio "r" is the lowest value with the minimum width of the V-groove of the first pulley 40 (while the movement of the movable rotor 50 is mechanically prevented).

Referring back to FIG. 2, the fluid discharged from the port 150b of the first pressure regulating valve 100 is fed into the lock-up clutch line 92, and directed to a lock-up pressure regulating valve 310 for producing as a LOCK-UP CLUTCH pressure Pcl suitable for operating the lock-up clutch 36 of the fluid coupling 12. The lock-up pressure regulating valve 310 has a valve spool 312 which receives as a feedback pressure the LOCK-UP CLUTCH pressure Pcl. The spool 312 is biased by this feedback pressure Pcl toward its open position. The valve 310 further has a spring 314 for biasing the spool 312 to the closed position, a chamber 316 to which is applied the THROTTLE pressure Pth, and a plunger 317 which receives the pressure in the chamber 316 to thereby bias the spool 312 toward the closed position. The valve spool 312 is moved to a position of equilibrium between a thrust based on the feedback pressure Pcl and a biasing force of the spring 314, whereby the LOCK-UP CLUTCH pressure Pcl in the lock-up clutch line 92 is suitably adjusted depending upon the THROTTLE pressure Pth. Therefore, the lock-up clutch 36 is engaged with a required minimum engaging force which increases with the currently required output torque of the engine 10. The fluid discharged from the lock-up pressure regulating valve 310 is supplied to various portions of the power transmitting system through a flow restrictor 318 and a lubrication line 94, and is returned to the return line 78 connected to the oil pump 74.

The fourth pressure line 370 is connected to a second relay valve 440 through a flow restrictor 331, and a third solenoid-operated valve 330 is provided between the restrictor 331 and the second relay valve 440. When the third solenoid-operated valve 330 is placed in its OFF position, the pressure in a portion of the line connecting the restrictor 331 and second relay valve 440 is drained. When the valve 330 is ON, the valve 330 produces a pilot pressure Psol3 which is equal to the fourth line pressure Pl4 in the fourth pressure line 370. The fourth pressure line 370 is also connected to a rapid lock-up clutch release valve 400 through a flow restrictor 344, and a fourth solenoid-operated valve 346 is provided between the restrictor 344 and the rapid lock-up clutch release valve 400. When the fourth solenoid-operated valve 400 is placed in the OFF position, the pressure in a portion of the line connecting the restrictor 344 and the valve 400 is drained. When the valve 346 is ON, the valve 346 produces a pilot pressure Psol4 which is equal to the fourth line pressure Pl4. The fourth pressure line 370 is also connected to the second line pressure reducing control valve 380 through a flow restrictor 394. The fifth solenoid-operated valve 392 indicated above with respect to the shift-down chamber 283 is provided between the restrictor 394 and the valve 380. When the valve 392 is OFF, the pressure in a portion of the line connecting the restrictor 394 and valve 380 is drained. When the valve 392 is ON, the valve 392 produces a pilot pressure Psol5 which is equal to the four line pressure Pl4. In the present embodiment, the combinations of the pilot pressures Psol3, Psol4 and Psol5 permit a plurality of hydraulic control operations for normal engagement and rapid release of the lock-up clutch 36, back pressure control of the accumulator 340, reduction in the second line pressure Pl2 when the shift lever 252 is placed in the NEUTRAL position "N", reduction in the second line pressure at a high running speed of the vehicle, and reverse inhibit control operation (which will be described). As described above, the pilot pressure Psol5 is provided for moving the spool 280 of the directional control valve 262 to the shift-down position in the event of a trouble with the first and/or second solenoid-operated valve(s) 266, 268. The fifth solenoid-operated valve 392 and the flow restrictor 394 serve as means for generating the pilot pressure Psol5.

The operations of the lock-up clutch control valve 320 and rapid lock-up clutch release valve 400 for effecting engagement and rapid releasing of the lock-up clutch 36 will be described. The lock-up clutch control valve 320 functions to supply the LOCK-UP CLUTCH pressure Pcl in the lock-up clutch line 92 to the engaging line 322 or the releasing line 324 of the fluid coupling 12, for engaging or releasing the lock-up clutch 36. The rapid lock-up clutch release valve 400 functions to permit the fluid discharged from the lock-up clutch 36 to be fed into the drain without passing through the oil cooler 339, so that the lock-up clutch 36 is rapidly released.

The lock-up clutch control valve 320 is a spool valve which includes ports 321a–321g, a valve spool 326 having a first and a second position, and a spring 328 for biasing the spool 326 toward the releasing position (indicated at OFF in FIG. 2). When the valve spool 326 is placed in the engaging position (indicated at ON in FIG. 2), the port 321c receiving the LOCK-UP CLUTCH pressure Pcl and the port 321d are connected to each other, the port 321b and the drain port 321a are connected to each other, and the ports 321e and 321f are connected to each other. When the spool 326 is placed in the releasing position, the ports 321c and 321b are connected to each other, the ports 321d and 321e are connected to each other, and the ports 321f and 321g are connected to each other. The lower end of the spool 326 (remote from the spring 328) partially defines a chamber 332 which receives the pilot pressure Psol3 when the third solenoid-operated valve 330 is placed in the ON position.

The rapid lock-up clutch release valve 400 is a spool valve which includes a port 402a communicating with the lock-up clutch line 92 through a flow restrictor 401, a port 402b communicating with the releasing line 324, a port 402c communicating with the port 321b of the lock-up clutch control valve 320, a port 402d communicating with the port 321f of the lock-up clutch control valve 320, a port 402e communicating with the engaging line 322, and a port 402f communicating with the port 321d of the valve 320. The rapid lock-up clutch release valve 400 further has a valve spool 406 having two positions, and a spring 408 for biasing the spool 406 toward its fourth or rapid release position (indicated at ON in FIG. 2). When the valve spool 406 is placed in the normal release position (indicated at OFF in FIG. 2), the ports 402b and 402c are connected to each other, while the ports 402e and 402f are connected to each other. When the spool 406 is placed in the rapid release position, the ports 402a and 402b are connected to each other, while the ports 402d and 402e are connected to each other. The lower end of the spool 406 partially defines a chamber 410 which receives the pilot pressure Psol4 when the fourth solenoid-operated valve 346 is placed in the ON position. In FIG. 2, the ON and OFF positions of the third solenoid-operated valve 330 correspond to the ON and OFF positions of the lock-up clutch control valve 320, respectively, while the ON and OFF positions of the fourth solenoid-operated valve 346 correspond to the ON and OFF positions of the rapid lock-up clutch release valve 400, respectively.

When the third solenoid-operated valve 330 is turned ON while the fourth solenoid-operated valve 346 is OFF, the spool 326 is moved to the engaging or ON position, the fluid in the lock-up clutch line 92 is fed into the engaging chamber 33 of the fluid coupling 12 through the ports 321c, 321d, 402f, 402e and the engaging line 322, while at the same time the fluid in the releasing chamber 35 is discharged into the drain through the releasing line 324, ports 402b, 402c, 321b and 321a. Thus, the lock-up clutch 36 is engaged in an engaging mode as indicated in FIG. 15. The fluid passages for feeding and discharging the fluid into and out of the fluid coupling 12 for engaging the lock-up clutch 36 as described above are referred to as "third fluid passage means".

When the third solenoid-operated valve 330 is turned OFF while the fourth solenoid-operated valve 346 is OFF, the fluid in the lock-up clutch line 92 is fed into the releasing chamber 35 of the fluid coupling 12 through the ports 321c, 321b, 402c and 402b and the releasing line 324, while at the same time the fluid in the engaging chamber 33 is discharged into the drain through the engaging line 322, ports 402e, 402f, 321d and 321e, and oil cooler 339. Thus, the lock-up clutch is released in a first release mode as indicated in FIG. 15. The fluid passages for feeding and discharging the fluid into and out of the fluid coupling 12 for releasing the clutch 36 as described above are referred to as "first fluid passage means".

When the third and fourth solenoid-operated valves 330 and 346 are both turned ON, the fluid in the lock-up clutch line 92 is fed into the releasing chamber 35 of the fluid coupling 12 through the ports 402a and 402b and the releasing line 324, while at the same time the fluid in the engaging chamber 33 is discharged through the engaging line 322, ports 402e, 402d, 321f and 321e, and oil cooler 339. Thus, the lock-up clutch 36 is released in a second release mode as indicated in FIG. 15. The fluid passages for feeding and discharging the fluid into and out of the fluid coupling 12 for releasing the lock-up clutch 36 as described above are referred to as "fourth fluid passage means".

Since the first and second release modes are available, the lock-up clutch 36 is not erroneously held in the engaged position even if the spool 326 of the lock-up clutch control valve 320 is stuck in the ON position or the spool 406 of the lock-up clutch rapid release clutch 400 is stuck in the OFF position. In other words, if the lock-up clutch 36 remains in the engaged position even after a predetermined one of the first and second release modes is commanded to be established for releasing the clutch 36, the other release mode is selected to release the clutch 36, whereby the otherwise possible engine stall is prevented, and the vehicle can be smoothly re-started. Further, if the spool 326 of the valve 320 is stuck in the OFF position or the spool 406 of the valve 400 is stuck in the ON position, the lock-up clutch 36 is actually placed in the rapid release mode even if the engaging mode is commanded to be selected. In this case, the other release mode is selected. If the rapid release mode is continuously established, the fluid is charged without passing through the oil cooler 339, and the working fluid may be overheated. Therefore, the provision of the first and second release modes prevents the overheating of the working fluid in the event of a trouble with the valve 320.

Where the lock-up clutch 36 should be rapidly released upon application of an abrupt brake to the vehicle, the third and fourth solenoid-operated valves 320 and 346 are placed in the OFF and ON positions, respectively In this case, a rapid release mode is established as indicated in FIG. 15. In this rapid release mode, the fluid in the lock-up clutch line 92 is fed into the releasing chamber 35 primarily through the ports 402a and 402b and the releasing line 324, while at the same time the fluid in the engaging chamber 33 is discharged through the engaging line 322, and the ports 402e, 402d, 321f and 321g. That is, the engaging chamber 33 is drained without the fluid passing through the oil cooler 339 which has a relatively high fluid flow resistance. Accordingly, the lock-up clutch 36 is rapidly released. The fluid passages for rapidly releasing the clutch 36 are referred to as "second fluid passage means".

The pressure of the working fluid discharged to the drain without passing through the oil cooler 339 is lowered to a suitable level by a cooler pressure control relief valve 338 disposed upstream of the oil cooler 339.

The engaging line 322 is connected to the oil cooler 339 by a by-pass line 334 which is provided with a flow restrictor 336. Another flow restrictor 337 is provided between the flow restrictor 336 and the lock-up clutch control valve 320. These restrictors 336 and 337 determines the rates of flow of the fluid from the engaging chamber 33 of the fluid coupling 12 and the valve 320 into the oil cooler 339. That is, a portion of the fluid is cooled by the oil cooler 339 even while the lock-up clutch 36 is placed in the engaged position.

There will next be described the operations of the first relay valve 380 and a second relay valve 440 for effecting the above-indicated accumulator back pressure regulating operation, second line pressure reduction with the shift lever 252 in the NEUTRAL position "N", second line pressure reduction at a high vehicle speed, and reverse inhibit control operation.

The first relay valve 380 has a port 382a communicating with a port 442c of the second relay valve 440, a port 382b receiving the pilot pressure Psol5, a port 382c communicating with the chamber 135 of the second pressure regulating valve 102 and the chamber 435 of the REVERSE INHIBIT valve 420 (previously indicated), and a drain port 382d. The first relay valve 380 has a spool 384 having ON and OFF positions as indicated in FIG. 2, and a spring 386 for biasing the spool 384 toward the OFF position. When the spool 384 is placed in the OFF position, the ports 382a and 382b are connected to each other, while the port 382c and drain port 382d are connected to each other. When the spool 384 is placed in the ON position, the port 382a is connected to the drain, while the ports 382b and 382c are connected to each other. The end of the spool 384 remote from the spring 386 partially defines a chamber 388 adapted to receive the pilot chamber Psol4. When the pilot pressure Psol4 is not applied to the chamber 388, the spool 384 is placed in the OFF position, whereby the pilot pressure Psol5 is applied to the chamber 136 of the second pressure regulating valve 201 and to a chamber 435 of the REVERSE INHIBIT valve 420. When the pilot pressure Psol4 is applied to the chamber 388, the spool 384 is moved to the ON position, whereby the pilot pressure Psol5 is applied to the port 442c of the second relay valve 440. In FIG. 2, the ON and OFF positions of the first relay valve 380 correspond to the ON and OFF positions of the fourth solenoid-operated valve 346, respectively.

The second relay valve 440 has ports 442b and 442c which communicate with each other and with the chamber 133 of the second pressure regulating valve 102 through a flow restrictor 443, a port 442d which communicates with an accumulator 372 and the fourth pressure regulating valve 170, and a drain port 442e. The valve 440 has a spool 444 which is movable between an ON and an OFF position as indicated in FIG. 2, and a spring 446 for biasing the spool 444 toward the OFF position. With the spool 444 placed in the ON position, the port 442d is connected to the drain port 442e. With the spool 444 placed in the OFF position, the port 442d is disconnected from the drain port 442e. The end of the spool 444 remote from the spring 446 partially defines a chamber 448 adapted to receive the pilot pressure Psol3. When the pilot pressure Psol3 is not applied to the chamber 448, the spool 444 is placed in the OFF position. When the pilot pressure Psol3 is applied to the chamber 448, the spool 444 is moved to the ON position, whereby the pilot pressure Psol5 which is applied to the chamber 133 through the ports 442c, 442b is also applied to the accumulator 372 and a chamber 177 of the fourth pressure regulating valve 170. In FIG. 2, the ON and OFF positions of the second relay valve 440 correspond to the ON and OFF positions of the third solenoid-operated valve 330, respectively.

There will be described the back pressure control operations of the accumulators 340 and 342 for the FORWARD clutch 70 and REVERSE brake 72. When the fifth solenoid-operated valve 392 is operated in the duty cycling manner, the pilot pressure Psol5 produced downstream of the flow restrictor 394 varies with the duty cycle Ds5 of the valve 392, as indicated in FIG. 16. Thus, the restrictor 394 and the fifth solenoid-operated valve 392 function as means for producing the pilot pressure Psol5 which is applied to the accumulator 372 and the fourth pressure regulating valve 170 through a line 348, for regulating the back pressures of the accumulators 340, 342, while the first and second relay valves 380 and 440 are placed on the ON and OFF positions, respectively.

The back pressures of the accumulators 340, 342 are controlled in order to limit a rate of rise in the pressures in the cylinders of the clutch 72 and brake 70, for thereby reducing engaging shocks of the clutch 72 and brake 70, when the shift lever 252 is operated from the NEUTRAL position "N" to the DRIVE position "D" or REVERSE position "R". To this end, the fourth pressure regulating valve 170 is adapted to regulate the fourth line pressure Pl4 which is applied through a fourth pressure line 370 to back pressure ports 366 and 368 of the accumulators 342, 340 for the clutch 72 and brake 70. That is, the fourth pressure regulating valve 170 functions to control the pressure absorbing functions of the accumulators 342, 340, so as to minimize the engaging shocks of the clutch 72 and brake 70.

Figure 17:
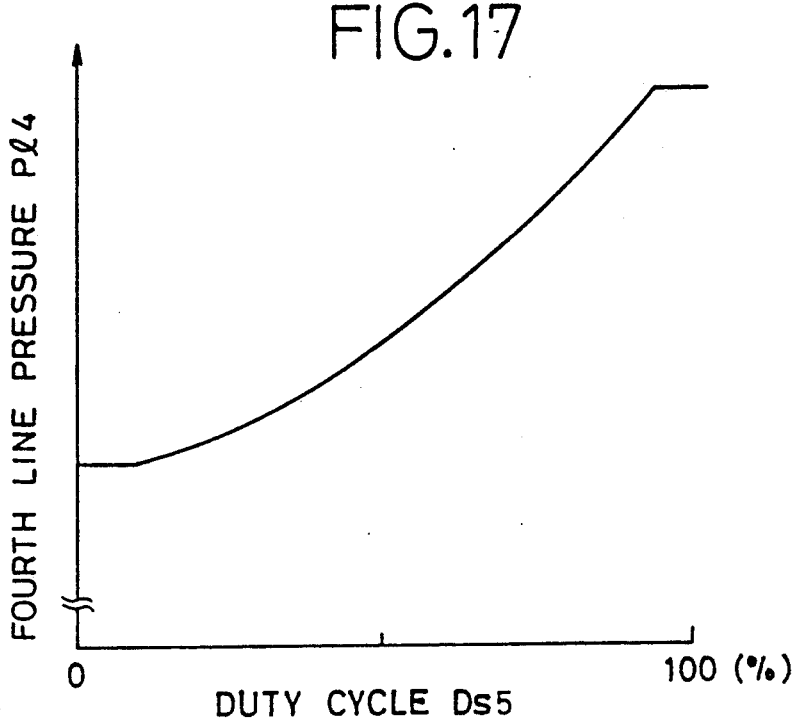
FIG. 17 is a view indicating a relationship between the duty cycle of the fifth solenoid valve and a fourth line pressure continuously changed with the duty cycle.

The fourth pressure regulating valve 170 is adapted to regulate the fourth line pressure Pl4 depending upon the pilot pressure Psol5. More specifically, when the shift lever 252 is shifted from the NEUTRAL position "N" to the DRIVE position "D" or REVERSE position "R", the fifth solenoid-operated valve 392 is operated in the duty cycling manner, so as to change the fourth line pressure Pl4 with the duty cycle Ds5, as indicated in FIG. 17, with the pilot pressure Psol5 being applied to the chamber 177 of the fourth pressure regulating valve 170. The duty cycle Ds5 is determined so that the back pressures of the accumulators 340, 342 determined by the fourth line pressure Pl4 minimize the engaging shock of the clutch 70 or brake 72. When the pressure in the cylinder of the clutch 72 rises to the third line pressure Pl3, the pilot pressure Psol5 which has been applied to the fourth pressure regulating valve 170 is cut off by the second relay valve 440, whereby the chamber 177 is exposed to the atmosphere, and the fourth line pressure Pl4 is regulated to a relatively low level in the neighborhood of 4kg/cm², which corresponds to the biasing force of the spring 172 biasing the spool 171 toward the open position. The thus regulated fourth line pressure Pl4 is used primarily as a pilot pressure for controlling the directional and flow control valves 262, 264 of the shift control valve assembly 260. Thus, the fourth pressure regulating valve 170 functions as a device for generating a pilot pressure for operating the directional and flow control valves 262, 264. The accumulator 372 connected to the line 348 functions to absorb the pulsation of the pilot pressure Psol5 which would arise in relation to the frequency of the duty cycling drive pulses to activate the fifth solenoid-operated valve 392.

Then, there will be described the operation to lower the second line pressure Pl2 for protecting the transmission belt 44 against an overload due to a pressure rise in the driven side cylinder 54, 56, which pressure rise is caused by a centrifugal force during rotation of the driven side pulley 40, 42. More specifically, when the vehicle is running at a relatively high speed with the output shaft 38 of the CVT 14 rotating at a high speed, the second line pressure Pl2 applied to the driven side cylinder (e.g., cylinder 56) is lowered by turning OFF the fourth solenoid-operated valve 346 and first relay valve 380 and turning ON the fifth solenoid-operated valve 392. This reduction in the second line pressure Pl2 is effected irrespective of the operating states of the third solenoid-operated valve 330 and second relay valve 440. That is, the pilot pressure Psol5 Pl4) is applied to the chamber 136 of the second pressure regulating valve 102 through the ports 382b and 382c of the first relay valve 380, whereby the second line pressure Pl2 is regulated according to the following equation (3):

$$Pl2 = [A4 \cdot Pth + (A5 - A4) \cdot Psol5 + W - A1 \cdot Pr - (A2 - A1) \cdot Psol\,5]/(A3 - A2) \qquad (3)$$

Figure 18:
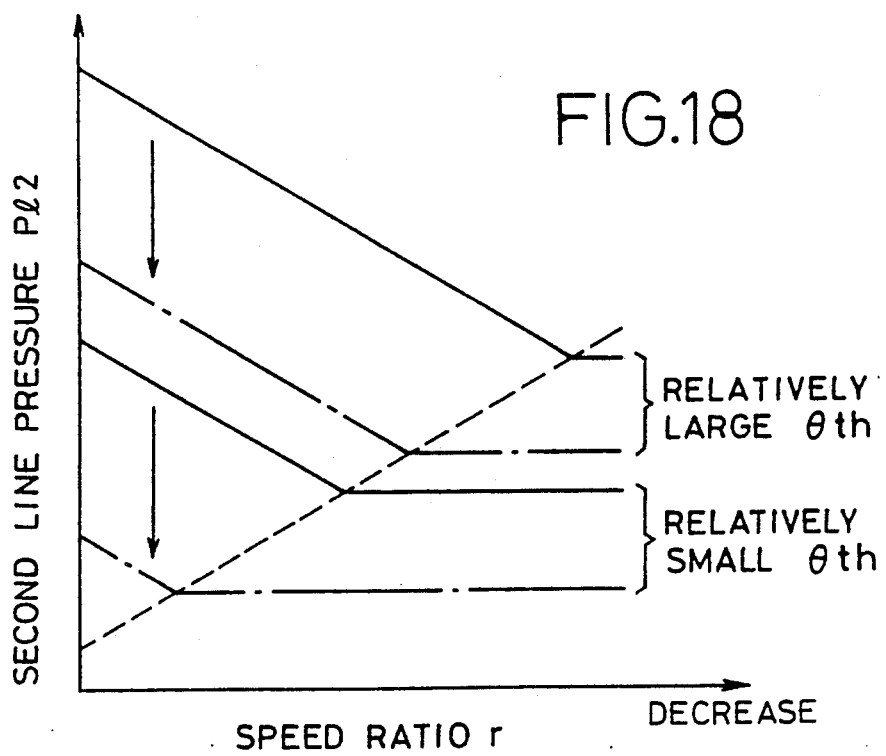
FIG. 18 is a view indicating the second line pressure which varies with the running speed of the vehicle.

The second line pressure Pl2 as regulated according to the above equation (3) as indicated in one-dot chain lines in FIG. 18 is lowered with respect to the normally regulated second line pressure as indicated in solid lines. The lowering of the pressure P(2 eliminates or minimizes an adverse influence of an excessive rise in the driven side cylinder 56 due to the centrifugal force, whereby the durability of the transmission belt 44 is increased. The second line pressure Pl2 is lowered also when the reverse inhibit control operation (which will be described below) and when the shift lever 252 is operated to the NEUTRAL position "N". It is noted that the second line pressure Pl2 is normally regulated according to the equation (1), when the fourth solenoid-operated valve 346 is turned ON or fifth solenoid-operated valve 392 is turned OFF.

The REVERSE INHIBIT valve 420 is provided to inhibit the reversing device 16 from being placed in the reverse position with the REVERSE brake 70 engaged, when the vehicle is running in the forward direction. This valve 420 has ports 422a and 422b adapted to receive the third line pressure Pl3 from the output port 256 of the shift lever valve 250 when the valve 250 is placed in the REVERSE position "R". The REVERSE INHIBIT valve 420 further has a port 422c communicating with the cylinder of the REVERSE brake 70 through a line 423, and a drain port 422d. The valve 420 includes a valve spool 424 slidably movable between a first or non-inhibit position corresponding to one end (upper end) of the operating stroke and a second or reverse inhibit position corresponding to the other end (lower end) of the operating stroke. The spool 424 is biased by a spring 426 toward the first position. A plunger 428 is provided in abutting contact with the lower end of the spool 424. The plunger 428 has a smaller diameter than the spool 424. The upper end portion of the spool 424 has a first land 430, a second land 432 having a larger diameter than the first land 430, and a third land 434 having the same diameter of the second land 432. These three lands 430, 432, 434 are arranged from the upper end of the spool 424 in the order of description. The first land 430 at the upper end of the spool 424 partially defines a chamber 435 which is adapted to receive the pilot pressure Psol5 through the first relay valve 380 placed in the OFF position. The first and second lands 430 432 define a chamber 436, while the second and third lands 432, 434 define a chamber 437. These chambers 436 and 437 are adapted to receive the third line pressure Pl3 from the shift lever valve 250 only when the shift lever 252 is placed in the REVERSE position "R". The spool 424 and the plunger 428 define a chamber 438 which is adapted to receive the pressure in the REVERSE brake 70. The plunger 428 partially defines a chamber 439 to which the third line pressure Pl3 is always applied. The area of the plunger 428 which receives the third line pressure Pl3 is substantially equal to the area of the first and second lands 430, 432 which receives the pressure in the chamber 436.

In the thus constructed REVERSE INHIBIT valve 420, the spool 424 is moved to the second or reverse inhibit position against the biasing force of the spring 426 to inhibit the reversing device 16 from being placed in the reverse position, when the valve closing thrust force based on the pilot pressure Psol5 and third line pressure Pl3 exceeds the valve opening thrust force based on the biasing force of the spring 426, pressure in the REVERSE brake 70 and third line pressure Pl3. In this reverse inhibit position, the ports 422b and 422c are disconnected from each other, while the port 422c and the drain port 422d are connected to each other, whereby the REVERSE brake 70 is drained. That is, when the pilot pressure Psol5 is applied to the chamber 435 with the fourth and fifth solenoid-operated valves 346 and 392 being turned OFF and ON, respectively, the reversing device 16 is prevented from being placed in the reverse position provided that the shift lever 252 is placed in the REVERSE position "R". However, the spool 424 of the REVERSE INHIBIT valve 420 is moved to the first or non-inhibit position under the biasing force of the spring 426, for communication of the REVERSE brake 70 with the port 256 of the shift lever valve 250, when the fourth solenoid-operated valve 346 is turned ON, or when the fifth solenoid-operated valve 392 is turned OFF, or when the shift lever 252 is moved to a position other than the REVERSE position "R". The REVERSE INHIBIT valve 420 functions to inhibit the REVERSE brake 70 from being engaged and maintain the reversing device 16 in the neutral position, if the shift lever 252 is operated from the DRIVE position "D" to the REVERSE position "R" through the NEUTRAL position "N", while the fourth and fifth solenoid-operated valves 346 and 392 are placed in the OFF and ON by an electronic control device 460 which will be described.

While the first relay valve 380 is OFF, that is, while the fourth solenoid-operated valve 346 is OFF, the pilot pressure Psol5 is applied to the chamber 136 of the second pressure regulating valve 102 through the first relay valve 380. As a result, the second line pressure Pl2 is lowered depending upon the pilot pressure Psol5, whereby the tension of the belt 44 of the CVT 14 is minimized to an extent that assures a non-slipping operation of the belt 44. Accordingly, the operating noise of the belt 44 is reduced, and the durability of the belt 44 is increased.

While the first and second relay valves 380 and 440 are both ON, that is, while the fourth and third solenoid-operated valves 346 and 330 are both ON, the pilot pressure Psol5 is applied to the chamber 133 of the second pressure regulating valve 102 through the first and second relay valves 380, 440, whereby the second line pressure Pl2 is raised by a suitable amount depending upon the pilot pressure Psol5. This increase in the second line pressure Pl2 is effected when the CVT 14 is rapidly shifted down due to an abrupt brake application or an operation of the shift lever 252 from the DRIVE position "D" to the LOW position "L", for example, or when the back pressures of the accumulators 340, 343 are controlled upon operation of the shift lever 252 from the NEUTRAL position "N" to the DRIVE or REVERSE position "D", "R". That is, the tension of the belt 44 of the CVT 14 is temporarily increased to increase the torque transmitting capacity of the CVT 14, to prevent otherwise possible slipping of the belt 44 on the pulleys 40, 42 in the above-indicated operating conditions of the vehicle.

Figure 19:
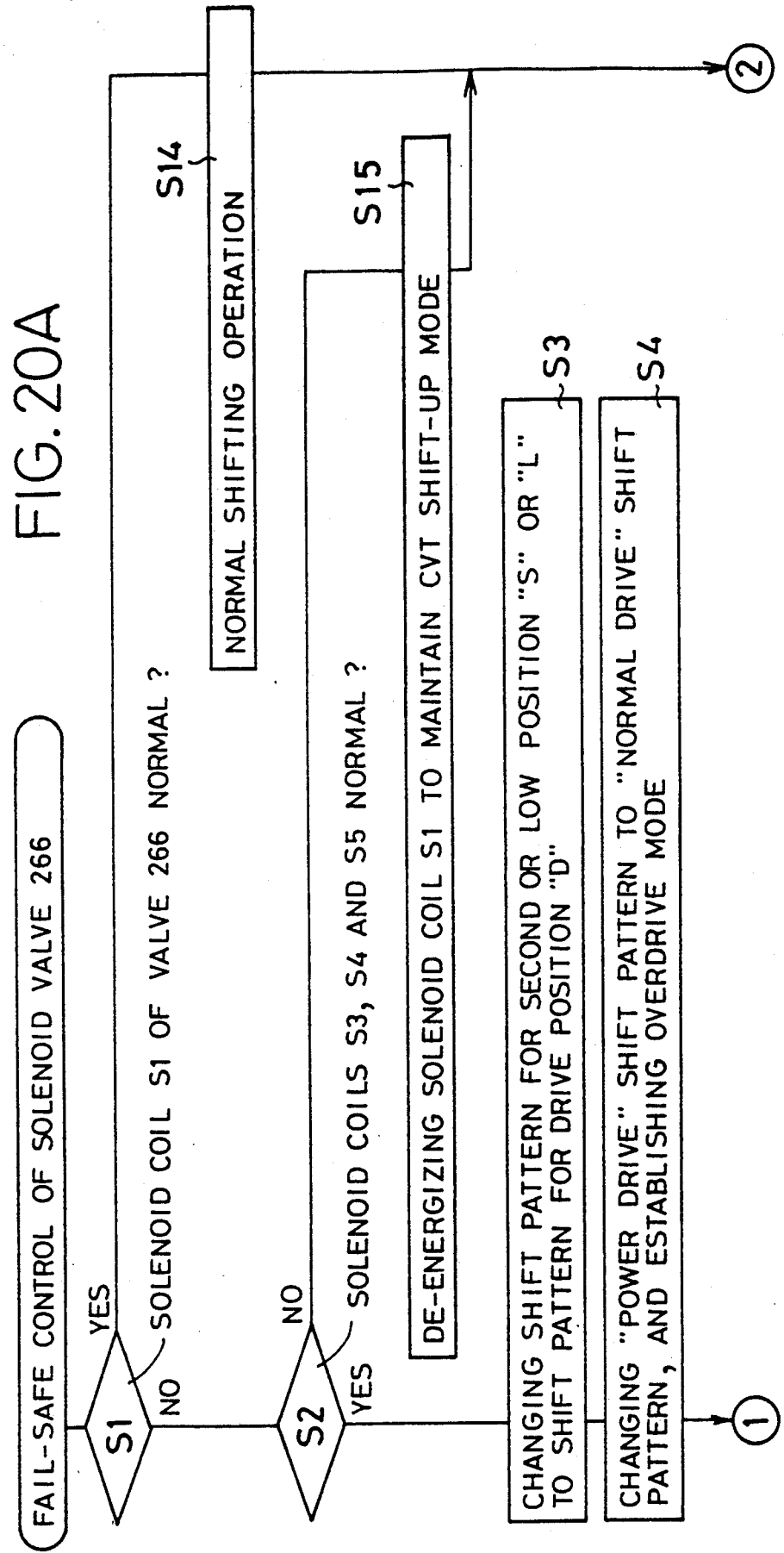
FIG. 19 is a view indicating a relationship between hydraulic control modes of the apparatus of FIGS. 2 and different combinations of third, fourth and fifth solenoid valves.

FIG. 19 provides a table which indicates the control operations corresponding to the respective different combinations of the operating states of the third, fourth and fifth solenoid-operated valves 330, 346 and 392.

Referring back to FIG. 1, there is indicated the above-indicated electronic control device 460, which serves as control means for controlling the first, second, third fourth and fifth solenoid-operated valves 266, 268, 330, 346 and 392 incorporated in the hydraulic circuit shown in FIG. 2. These valves are selectively energized or turned ON by the control device 460, for controlling the speed ratio "r" of the CVT 14, the operating state of the lock-up clutch 36 of the fluid coupling 12, and the second line pressure Pl2, for example. The electronic control device 460 includes a so-called microcomputer which incorporates a central processing unit (CPU), a random-access memory and a read-only memory, as well known in the art.

The control device 460 receives various signals from various sensors, such as: a VEHICLE speed sensor 462 disposed to detect the rotating speed of the drive wheels 24, and generating a vehicle speed signal representative of the detected speed, i.e., a running speed SPD of the vehicle; an INPUT SHAFT speed sensor 464 disposed to detect the rotating speed of the input shaft 30 of the CVT 14, and generating an input shaft speed signal representative of the detected speed Nin of the input shaft 30; an OUTPUT SHAFT speed sensor 466 disposed to detect the speed of the output shaft 38 of the CVT 14, and generating an output shaft speed signal representative of the detected speed Nout of the output shaft 38; a THROTTLE sensor 468 disposed to detect an angle of opening of the throttle valve disposed in a suction pipe of the engine 10, and generating a throttle signal representative of the opening angle $\theta$th of the throttle valve; a SHIFT LEVER sensor 470 disposed to detect the currently selected operating position of the shift lever 252, and generating a signal representative of the currently selected position Ps of the shift lever 252; a BRAKE switch 472 disposed to detect an operation of a brake pedal of the vehicle, and generating a signal indicative of the operation of the brake pedal; and an ENGINE SPEED switch 474 disposed to detect a speed Ne of the engine 10, and generating a signal indicative of the engine speed Ne. The CPU of the electronic control device 460 processes these input signals according to control programs stored in the ROM, while utilizing a temporary data storage function of the RAM, and applies appropriate drive or control signals to the first, second, third, fourth and fifth solenoid-operated valves 266, 268, 330, 346 and 392.

Upon application of power to the control device 460, a main control routine is executed after the initialization of the device. In the main control routine, the speeds Nin and Nout of the input and output shafts 30, 38, speed ratio "r" of the CVT 14, the vehicle running speed V and other running parameters of the vehicle are calculated based on the input signals received from the various sensors indicated above. Based on the received input signals, the control device 460 operates to control the lock-up clutch 36 and the CVT 14, and effect the control operations such as the accumulator back pressure control operation, reverse inhibit operation of the REVERSE brake 70, second line pressure reduction and increase, and fail-safe control operation associated with the solenoid-operated valves 266, 268, as indicated in FIG. 19, in a controlled sequence depending upon the operating conditions of the vehicle.

In controlling the CVT 14, the electronic control device 460 operates based on various input signals from the various sensors. Initially, the control device 460 calculates a desired or target speed Nin* of the input shaft 30 from the currently selected position Ps of the shift lever 252, and the detected throttle opening angle $\theta$th, vehicle running speed SPD and speeds Nin and Nout of the input and output shafts 30, 38, more precisely, according to a predetermined relationship represented by a functional equation Nin*=f($\theta$th, SPD, Ps). This relationship, which is stored in the ROM of the control device 460, is determined for each of the DRIVE, SECOND and LOW positions "D", "S" and "L" of the shift lever 252, so that the relevant relationship provides a currently required output of the engine 10 represented by the throttle opening angle $\theta$th, with a minimum fuel consumption by the engine 10. When the shift lever 252 is placed in the SECOND or LOW position "S", "L", it is generally required or desirable that the vehicle runs in a sporty manner with high drivability, and with a relatively high effect of engine-braking. In view of this requirement, the relationship used for the SECOND or LOW position is determined so that the desired input shaft speed Nin* is higher than that for the DRIVE position, or so that the speed ratio "r" is comparatively high. While the present power transmitting system (shift lever 252 and shift lever valve 250) has the three forward drive positions, DRIVE (D), SECOND (S) and LOW (L), the forward drive positions may be determined otherwise. For example, three or more forward drive positions may be provided in addition to the DRIVE position.

Then, the CPU of the control device 460 determines a control error $\Delta$Nin (=Nin* - Nin) which is a difference between the speed Nin of the input shaft 30 actually detected by the sensor 464 and the determined desired speed Nin*. Based on the determined control error $\Delta$Nin, one of six CVT shift modes I, II, III, IV, V and VI as indicated in the table of FIG. 10 is selected. The first and second solenoid-operated valves 266, 268 are controlled depending upon the selected CVT shift mode, so that, the CVT 14 is shifted such that the actual speed Nin coincides with the calculated desired speed Nin*.

The lock-up clutch 36 is engaged and rapidly released in the following manner. When the throttle opening angle $\theta$th and the vehicle speed SPD fall within a predetermined range (stored in the ROM of the control device 460) for engagement of the lock-up clutch 36, the control device 460 selects the engaging mode of the lock-up clutch 36 as indicated in FIG. 15, namely, the hydraulic control mode C as indicated in FIG. 19. This hydraulic control mode C is established by turning ON the third solenoid-operated valve 330 and turning OFF the fourth and fifth solenoid-operated valves 346 and 392. As a result, the lock-up clutch 36 is engaged. If the vehicle speed SPD exceeds a predetermined limit, e.g., 100km/h, in the hydraulic control mode C, the fifth solenoid-operated valve 392 is turned ON, whereby the mode C is replaced by the mode D, as indicated in FIG. 19. In this hydraulic control mode D, the second line pressure Pl2 is lowered by a suitable amount, for the purpose of preventing an excessive tension of the belt 44 due to the pressure rise in the hydraulic cylinder 56 by the centrifugal force.

If the throttle opening angle $\theta$th and the vehicle speed SPD with the shift lever 252 in the DRIVE position "D" falls within a predetermined range for releasing the lock-up clutch 36, or if the shift lever 252 is operated from the DRIVE position "D" to the NEUTRAL position "N", the first or second release mode of FIG. 15, namely, the hydraulic control mode A or H of FIG. 19 is established, with both of the third and fourth solenoid-operated valves 330, 346 being placed in the ON or OFF position. As a result, the lock-up clutch 36 is released. The hydraulic control mode H is selected when the torque transmitted by the CVT 14 is larger than usual, for example, when the vehicle is started, or when the shift lever 252 is moved from the DRIVE position "D" to the LOW position "L". In the mode H, the second line pressure Pl2 is raised by a suitable amount for increasing the tension of the belt 44.

Referring next to the flow chart of FIGS. 20A and 20B and an electric circuit diagram of FIG. 21, a fail-safe control operation of the electronic control device 460 will be described in connection with a trouble with a solenoid coil S1 of the first solenoid-operated valve 266 for the directional control valve 262, which would otherwise cause a shift-down failure of the CVT 14.

Figures 21, 22:
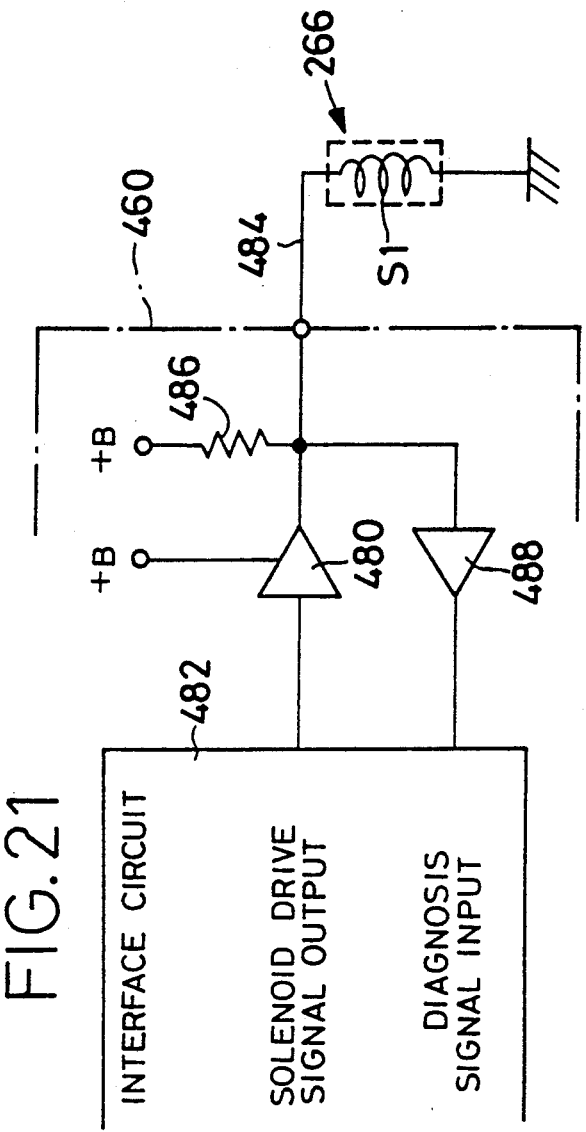
FIG. 21 is a view showing a circuit for driving a solenoid coil used for a valve used in the hydraulic control apparatus, and for detecting troubles with the coil.
FIG. 22 is a view indicating a diagnosis effected by the circuit of FIG. 21.

The electric circuit shown in FIG. 21 is adapted to drive the solenoid coil S1 of the first solenoid-operated valve 266, and detect a trouble with the solenoid coil S1. In the figure, one of opposite ends of the solenoid coil S1 is connected to a SOLENOID DRIVE SIGNAL output of an interface circuit 482 of the control device 460 through an amplifier 480 and a signal line 484, while the other end of the coil S1 is grounded. The signal line 484 is connected to a power source +B through a pull-up resistor 486, and to a DIAGNOSIS SIGNAL input of the interface circuit 482 through an amplifier 488. While the solenoid coil S1 is normally functioning, the coil S1 is de-energized and energized (off and on) with respective drive signals having low and high levels from the SOLENOID DRIVE SIGNAL output, respectively. As a result, the levels of diagnosis signals received by the DIAGNOSIS SIGNAL input are low and high when the levels of the drive signals are low and high, respectively, as indicated at Nos. 1 and 2 in the table of FIG. 22. The control device 460 determines that the solenoid coil S1 is normal, if the level of the drive signal supplied from the SOLENOID DRIVE SIGNAL output corresponds to the level of the diagnosis signal received by the DIAGNOSIS SIGNAL input. In the event of a disconnection or short-circuiting of the signal line 484 or coil S1, the drive signal and the diagnosis signals have different levels (L and H), as indicated at Nos. 3 and 4 in the table. Based on this fact, the control device 460 detects a trouble with the solenoid coil S1 (and signal line 484).

Trouble detecting circuits similar to that of FIG. 21 are provided for solenoids S2, S3, S4 and S5 of the second, third, fourth and fifth solenoid-operated valves 268, 330, 346 and 392, so that a trouble with these coils S2-S5 may be detected by the control device 460.

Figure 20:
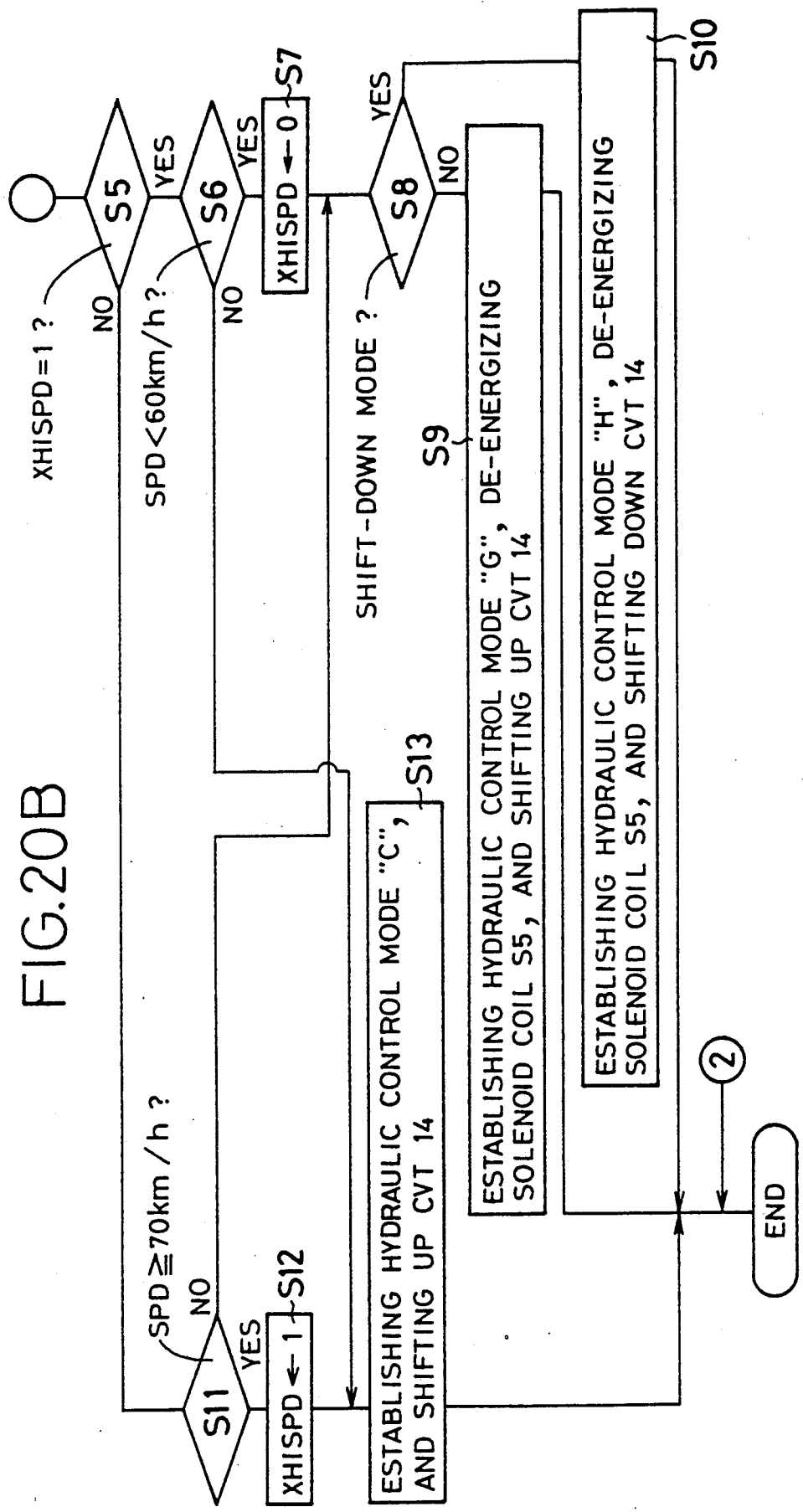
FIG. 20A and 20B are a flow chart illustrating a part of an operation of an electronic control device used for the hydraulic control apparatus of FIG. 1.

The determination of the presence of a trouble with the solenoid coil S1 of the valve 266 is effected in step S1 of a fail-safe control routine illustrated in the flow chart of FIGS. 20A and 20B. If the determination in step S1 reveals that the coil S1 is normal, or an affirmative decision (YES) is obtained in step S1, the control flow goes to step S14 in which the CVT 14 is normally controlled. If a negative decision (NO) is obtained in step S1, the control flow goes to step S2 to determine whether the solenoid coils S3-S5 are normal. The determination in this step S2 is made to confirm that a fail-safe control operation in subsequent steps S3-S13 can be performed. If any one of the coils S3-S5 is not normally functioning, step S2 is followed by step S15 in which the coil S1 is de-energized to maintain the CVT 14 in a shift-up mode, for example, in the slow shift-up mode IV of FIG. 10, so that the vehicle may continue to run in a safe manner.

If the determination in step S2 reveals that all of the coils S3-S5 are normal, the control flow goes to step S3 in which if the shift lever 252 is placed in the LOW or SECOND position "L" or "S", the shift pattern for that position is replaced by the shift pattern for the DRIVE position "D", so that the desired speed Nin* is lowered. In the next step S4, the shift pattern for a NORMAL DRIVE mode is selected if the control device 460 is placed in a POWER DRIVE mode with the appropriate selector switch turned on. Further, if an overdrive-off switch is placed in the ON position, the switch is turned OFF to establish the overdrive mode, so that the desired speed Nin* is lowered. These steps S3 and S4 are executed for the purpose of lowering the output torque of the engine 10 to assure a safe running of the vehicle in the event of a trouble with the solenoid coil S1.

Step S4 is followed by step S5 to determine whether a flag XHISPD is set at "1", or not. If the flag is set at "1", it indicates that the vehicle is running at a relatively high speed. Namely, the flag XHISPD is set to "1" in step S12 when a determination in step S11 reveals that the vehicle speed SPD is equal to or higher than 70km/h, and is reset to "0" in step S7 when a determination in step S6 reveals that the vehicle speed SPD falls below 60km/h.

If the vehicle speed SPD is not lower than 70km/h, or if the flag XHISPD is set at "1" while the vehicle speed SPD is not lower than 60km/h, the control flow goes to step S13 to establish the hydraulic control mode "C" of FIG. 19, by energizing the coil S3 of the third solenoid-operated valve 330 and de-energizing the coils S4 and S5 of the fourth and fifth solenoid-operated valves 346 and 392. As a result, the lock-up clutch 36 is engaged, and the second line pressure Pl2 is maintained at the normal level. In this condition in which the solenoid coil S1 is disconnected or short-circuited, the directional control valve 262 is in the shift-up position, the CVT 14 is operating at the lowest speed ratio "r" (Nin/Nout). Since the vehicle is currently running at a high speed (60km/h or higher), the vehicle may continue to run with the speed ratio "r" of the CVT 14 being lowered.

If the vehicle speed SPD is lower than 60km/h, or if the flag XHISPD is set at "0" while the speed SPD is not equal to or higher than 70km/h, this means that the vehicle is running at a relatively low or medium speed. In this case, the control flow goes to step S8 to determine whether any shift-down mode (I, II or III of FIG. 10) of the CVT 14 is currently selected or not. This determination is made based on whether the control error ΔNin (Nin* Nin) is negative, or not. If a negative decision (NO) is obtained in step S8, step S9 is executed to establish the hydraulic control mode "G" of FIG. 19, by energizing the coils S3 and S4 of the third and fourth solenoid-operated valves 330, 346 and de-energizing the coil S5 of the fifth solenoid-operated valve 392. Consequently, the lock-up clutch 36 is released and the second line pressure Pl2 is maintained at the normal level. In this case, too, the CVT 14 is shifted up.

If the determination in step S8 reveals that any CVT shift-down mode is currently selected, step S8 is followed by step S10 in which the coils S3, S4 and S5 of the third, fourth and fifth solenoid-operated valves 330, 346 and 392 are all energized to establish the hydraulic control mode "H" of FIG. 19, in which the lock-up clutch 36 is released and the second line pressure Pl2 is increased. In this condition, the disconnection or short-circuiting of the solenoid coil S1 of the first solenoid-operated valve 266 causes the spool 280 of the directional control valve 262 to be biased by the spring 282 in the direction toward the shift-up position. However, the energization of the coils S4 and S5 of the solenoid-operated valves 346 and 392 causes the pilot pressure Psol5 to be applied to the chamber 133 of the second pressure regulating valve 102 and the shift-down chamber 283 of the directional control valve 262, whereby the spool 280 is moved to the shift-down position, and the second line pressure Pl2 is increased. Consequently, the CVT 14 is shifted down.

In a conventional hydraulic control apparatus, the CVT is always shifted up in the event of a trouble trouble such as disconnection or short-circuiting of a solenoid coil for a directional control valve for the CVT. In the present hydraulic control apparatus, however, step S9 is executed to shift up the CVT 14 with the directional control valve 262 placed in the shift-up position, where the trouble occurs during operation of the CVT 14 in a shift-up mode, and step S10 is executed to shift down the CVT 14 with the valve 262 placed in the shift-down position, where the trouble occurs during operation of the CVT in a shift-down mode. Therefore, the present arrangement permits a continuing operation of controlling the speed ratio "r" of the CVT 14 such that the actually detected speed Nin of the input shaft 30 coincides with the desired speed Nin*.

As is apparent from the foregoing description, the present hydraulic control apparatus has various advantages as described below.

In the illustrated embodiment, the fourth pressure regulating valve 170 shown in FIG. 2 functions as means for producing the fourth line pressure Pl4 which is used to operate the directional and flow control valves 262, 264. The present apparatus is adapted to deal with a trouble with the fourth line pressure Pl4. If the fourth line pressure Pl4 cannot be normally supplied to the first and second solenoid-operated valves 266, 268, due to sticking of the spool 171 or any defect of the fourth pressure line 370, for example, the spool 280 of the directional control valve 262 is moved to the shift-up position by the biasing force of the spring 282 while the spool 288 of the flow control valve 264 is moved to the flow-restricting position by the biasing force of the spring 290, irrespective of the operating states of the first and second solenoid-operated valves 262, 268. Therefore, the slow shift-up operation of the CVT 14 is performed not only in the slow shift-up mode IV established by de-energizing both of the first and second solenoid-operated valves 266, 268, but also in the event of a trouble with the fourth line pressure Pl4. This arrangement prevents an abnormal rise of the speed of the engine 10 during a high speed running of the vehicle, which would occur if the CVT 14 were slowly shifted down as practiced according to a conventional arrangement.

In the illustrated embodiment, the slow shift-down mode III and slow shift-up mode IV can be established by turning ON and OFF the first solenoid-operated valve 266 while maintaining the second solenoid-operated valve 268 in the OFF state. That is, in the feedback control of the speed ratio "r" of the CVT 14, the second solenoid-operated valve 288 is not turned ON and OFF during a steady-state running of the vehicle with the control error ΔNin being held at a relatively small value, and is turned ON and OFF only while the vehicle is running in a transient state with a relatively large amount of the control error ΔNin, or only when the CVT 14 is commanded to be shifted up or down at a relatively high rate.

Another advantage of the present hydraulic control apparatus is derived from the arrangement of the shift control valve assembly 260 as shown in FIG. 9, in which the first line pressure Pl1 supplied from the port 278d (second output port) of the directional control valve 262 is applied to the first hydraulic cylinder 54 primarily through the second connecting line 272, in the slow shift-up mode IV wherein the spool 280 of the first solenoid-operated valve 266 is placed in the shift-up position (OFF position) while the spool 288 of the second solenoid-operated valve 268 is placed in the flow-restricting position (OFF position). While the spool 280 is placed in the shift-down position, however, the port 278d of the valve 262 is closed by the spool 280, whereby the second connecting line 272 is disconnected from the first pressure line 80. Although the second connecting line 272 functions as a by-pass line equipped with a check valve having a flow restricting function as disclosed in laid-open publication No. 64-49751 of unexamined Japanese Patent Application, the line 272 is not equipped with such a check valve, which may be comparatively easily worn out and deteriorate the durability of the hydraulic circuit.

While the directional control valve 262 is provided with the plunger 281 adapted to receive the pilot pressure Psol5 in the shift-down chamber 283, the two advantages described above may be offered even if the plunger 281 and the chamber 283 are eliminated.

A further advantage of the illustrated hydraulic control apparatus is derived from the provision of the plunger 281 which partially defines the shift-down chamber 283. Normally, the slow shift-up mode IV of FIG. 10 is established in the event of a trouble with the first or second solenoid-operated valve 266, 268, as described above. The slow shift-up mode IV permits a continuous running of the vehicle at a relatively high speed. If the valve 266, 268 is defective while it is necessary to shift down the CVT 14 (increase the speed ratio "r") for obtaining a relatively large drive torque, upon starting of the vehicle, for example, the pilot pressure Psol5 produced by the fifth solenoid-operated valve 392 is applied to the shift-down chamber 283 of the directional control valve 262, whereby the CVT 14 is shifted down.

Further, since the pilot pressure Psol5 used for shifting down the CVT 14 in the above case is also applied to the chamber 133 of the second pressure regulating valve 102, the second line pressure Pl2 is raised by a suitable amount, whereby the CVT 14 is shifted down at a higher rate than in the normal slow shift-down mode III of FIG. 10.

The illustrated embodiment provides another advantage that in the hydraulic control mode "H" of FIG. 19, the CVT 14 is rapidly shifted down by the pilot pressure Psol5 applied to the valve 262, to rapidly increase the speed ratio "r" upon operation of the shift lever 252 from the DRIVE position "D" to the LOW position "L" or upon rapid stopping of the vehicle.

Further, in the event of a trouble with the solenoid coil S1 of the first solenoid-operated valve 262 during a running of the vehicle at a high speed not lower than 70km/h, step S13 of the flow chart of FIGS. 20A and 20B is executed to shift up the CVT 14 to the smallest speed ratio "r" without increasing the second line pressure Pl2. This arrangement permits a continuing high-speed running of the vehicle, without an excessive tension of the belt 44, which leads to improved durability of the belt 44.

Figure 23:
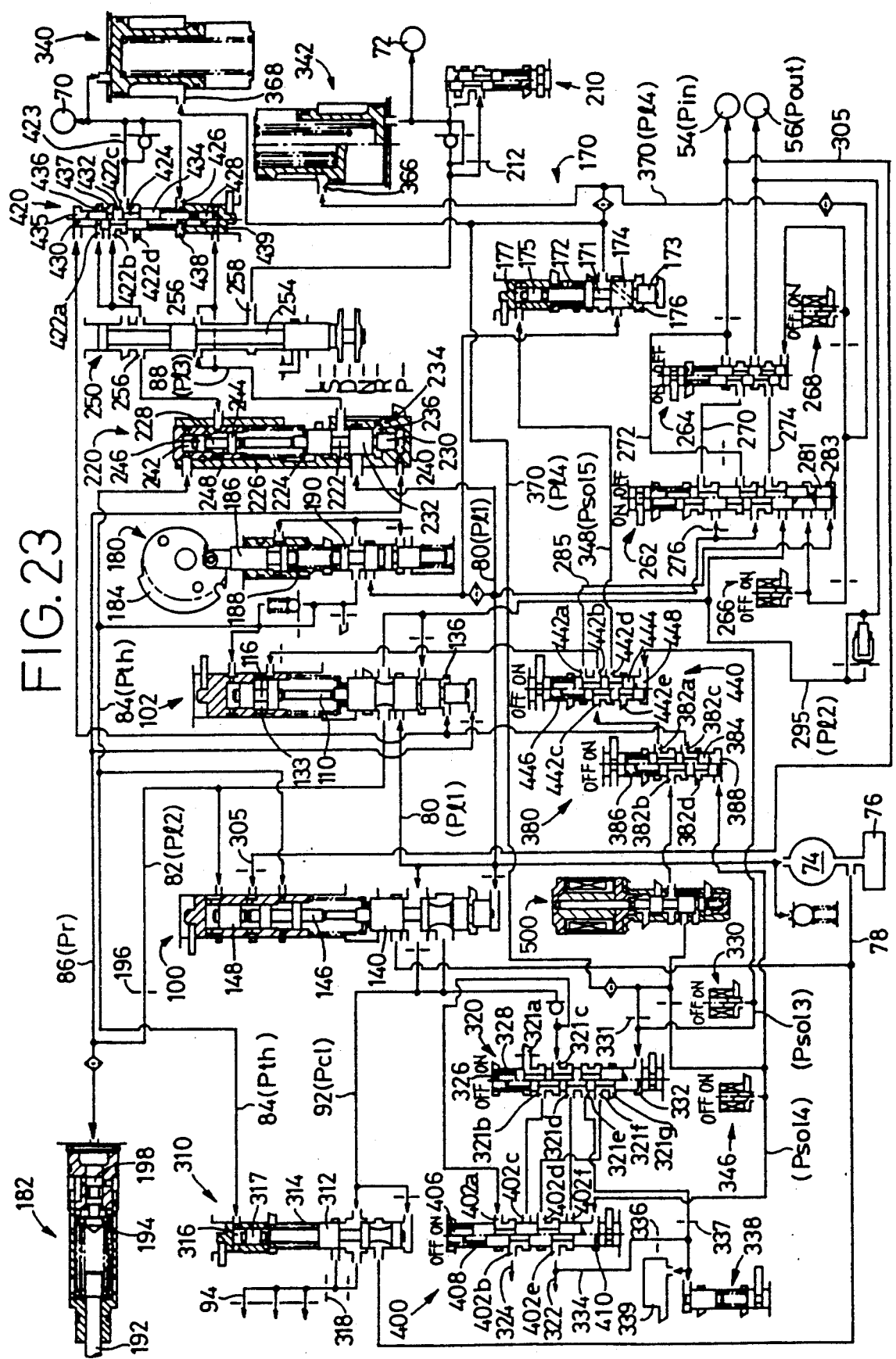
FIG. 23 is a view corresponding to that of FIG. 2, showing another embodiment of this invention.
Figure 24:
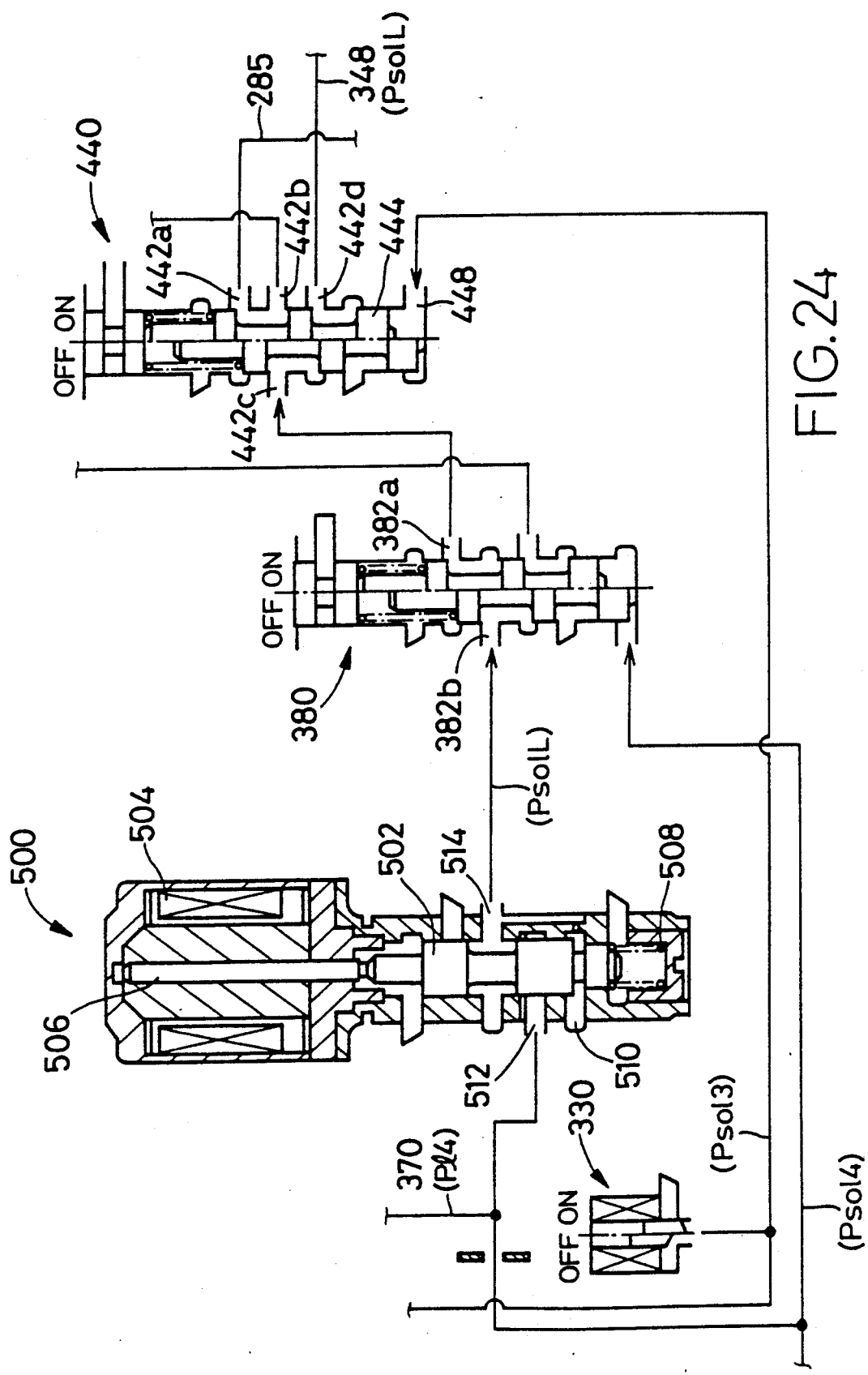
FIG. 24 is a view showing in enlargement a linear solenoid valve used in the embodiment of FIG. 23.

Referring next to FIGS. 23-25, there will be described a modified embodiment of the present invention. For easy understanding, the same reference numerals and characters as used for the preceding embodiment will be used in the present modified embodiment, to identify the corresponding elements, and no redundant description of these elements will be provided in the interest of brevity and simplification.

Briefly, the present embodiment is different from the preceding embodiment, in that the fifth solenoid-operated valve 392 used for producing the pilot pressure Psol5 is replaced by a linear solenoid-operated valve (proportioning valve) 500, which produces a pilot pressure PsolL that is continuously changed with a voltage or current of the drive signal received from the electronic control device 460. Further, the accumulator 372 for absorbing pressure pulsation upon duty cycling operation of the fifth solenoid-operated valve 392 is eliminated.

The linear solenoid-operated valve 500 as the fifth solenoid-operated valve is a pressure reducing type valve. As shown in detail in FIG. 24, the vale 500 has a spool 502 operated to regulate the fourth line pressure Pl4 into the pilot pressure PsolL, a linear solenoid coil 504 which is energized by a drive signal received from the control device 460, a core 506 for biasing the spool 502 toward a pressure-increase position upon energization of the coil 504, a spring 508 for biasing the spool 502 toward a pressure-decrease position, and a feedback chamber 510 adapted to receive the output pressure PsolL for biasing the spool 502 toward the pressure-decrease position. The spool 502 is positioned for equilibrium of forces acting in the opposite directions, namely, moved to a position at which the force produced by the core 506 to bias the spool 502 toward the pressure-increase position is equal to a sum of the biasing force of the spring 508 and the force produced by the pressure PsolL in the feedback chamber 510 to bias the spool 502 toward the pressure-decrease position. As a result, the output pilot pressure PsolL is changed in relation to the drive current Isol applied to the coil 504 by the control device 460, as indicated by a characteristic curve shown in FIG. 25. The fourth line pressure Pl4 received by an input port 512 of the valve 500 is reduced to the output pilot pressure PsolL at an output port 514, which is connected to the port 382b of the first relay valve 380. The fourth line pressure Pl4 or second line pressure Pl2 is controlled depending upon the pilot pressure PsolL produced by the linear solenoid-operated valve 500, when the control device 460 performs the control operations as shown in FIG. 19, that is, back pressure control operations of the accumulators 340, 342, reduction in the second line pressure Pl2 during a high speed running of the vehicle or upon operation of the shift lever 252 to the NEUTRAL position "N", and increase in the second line pressure Pl2 upon rapid shift-down operation of the CVT 14. The second line pressure Pl2 is regulated, as a principle, to a level as indicated at Pmec in FIG. 7 by the second pressure regulating valve 102. The second pressure regulating valve 102 is constructed so that the level Pmec is not lower than the ideal pressure level Popt indicated in FIG. 8. In this embodiment, the pilot pressure PsolL is controlled so that a calculated difference between the levels Pmec and Popt is minimized in a normal running of the vehicle with the third and fourth solenoid-operated valves 2330, 346 being both placed in the OFF position.

The second relay valve 440 has the port 442a which is connected to the line 285, and which is adapted to receive the pilot pressure PsolL from the valve 500 while the spool 444 of the valve 440 is ON (while the third solenoid-operated valve 330 is ON). The line 285 is connected to the shift-down chamber 283 of the valve 262. In this arrangement, the directional control valve 262 is placed in the shift-down position to permit the vehicle to be smoothly started, when the first and second solenoid-operated valves 262, 264 are both OFF in the event of a trouble with the solenoid coil S1.

In the present modified embodiment, the pilot pressure PsolL produced by the linear solenoid-operated valve 500 is changed with a change in the level of the analog drive signal applied to the coil 504, whereby the second and fourth line pressures Pl2 and Pl4 are suitably controlled, so as to improve the durability of the valve 500, reduce the fuel consumption of the engine 10 and the operating noise of the transmission system, and permit smooth shifting of the CVT 14. Further, the valve 500 does not require the accumulator 372 as used in the preceding embodiment for absorbing pulsation of the output pressure Psol5 caused during a duty cycling operation of the valve 392. Further, the back pressures of the accumulators 340, 342 for the brake 70 and clutch 72 can be controlled with improved accuracy and response, since the fourth line pressure Pl4 regulated by the linear solenoid-operated valve 500 in place of the duty-cycled valve 392 is used as the back pressures of these accumulators 340, 342.

In the present embodiment, an electrical disconnection of the solenoid coil 504 of the linear solenoid-operated valve 500 merely causes the second line pressure Pl2 to be equal to the level Pmec, and the vehicle can continue to run without slipping of the belt 44.

While the present invention has been described in its presently preferred embodiments by reference to the accompanying drawings, it is to be understood that the invention may be otherwise embodied, without departing from the spirit of the invention.

In the illustrated embodiments, the spool 280 of the directional control valve 262 is biased by the spring 282 toward the shift-up position, and is biased by the fourth line pressure Pl4 toward the shift-down position when the valve 266 is turned ON. However, the biasing directions of the spring 282 and the fourth line pressure Pl4 may be reversed. Further, the valve 262 may be adapted such that the spool 280 is moved in one direction by the biasing action of the spring 282 when the fourth line pressure Pl4 is applied to the opposite ends of the spool 280, and is moved in the opposite direction against the biasing force of the spring 282 when the fourth line pressure Pl4 acting on the end of the spool 280 on the side of the spring 282 is removed. The spool 280 may be positioned directly by a solenoid coil. In essence, the directional control valve 262 is operated in response to an operation of the first solenoid-operated valve 266, for changing the direction in which the CVT 14 is shifted. Similar modifications are available to the flow control valve 264.

In the illustrated embodiments, the second pressure regulating valve 102 has the chamber 133 for increasing the second line pressure Pl2 when the pilot pressure Psol5 is applied to the chamber 133. However, the second line pressure Pl2 may be increased when a pilot pressure normally applied to a chamber of the valve 102 is removed. Although the pilot pressure Psol5 produced by the fifth solenoid-operated valve 392 is applied to the chamber 133, another pilot pressure may be applied to the valve 102.

In the illustrated embodiments, the first and second line pressures Pl1 and Pl2 are used for operating the driving and driven side hydraulic cylinders 54, 56.

However, it is possible that a single line pressure is always applied to the driven side cylinder for adjusting the tension of the belt 44, while the fluid of that line pressure is fed and discharged into and out of the driving side cylinder through a shift control valve device, for changing the speed ratio of the CVT 14.

In the illustrated embodiments, the THROTTLE pressure Pth produced by the throttle sensing valve 180 which detects the throttle opening angle θth is used as a pressure representative of the currently required output of the engine 10. Where the hydraulic control apparatus of the invention is used for a vehicle having a diesel engine without a throttle valve, the pressure Pth may be replaced by a pressure which represents an amount corresponding to an amount of operation of an accelerator pedal of the vehicle. In this case, the cam 184 is mechanically linked with the accelerator pedal, so that the cam 184 is rotated as the pedal is depressed.

While the illustrated embodiments are adapted such that the speed ratio "r" of the CVT 14 is controlled so that the actually detected speed Nin of the input shaft 30 coincides with a determined desired or target speed Nin*, it is possible to control the speed ratio "r" so that the actually detected speed ratio "r" coincides with a determined desired ratio "r*", since the speed ratio "r" is equal to Nin/Nout.

The reversing device 16 which is located between the output shaft 38 of the CVT 14 and the intermediate gear device 18 in the illustrated embodiments, may be disposed between the fluid coupling 12 and the input shaft 30 of the CVT 14. The reversing device 16 may have two or more forward drive positions in addition to the reverse position.

The fluid coupling 12 may be replaced by other couplings such as torque converter, electromagnetic clutch and wet-type clutch.

It is to be understood that the present invention may be embodied with various other changes, modifications and improvements, which may occur to those skilled in the art, without departing from the scope of the invention defined in the following claims.

What is claimed is:

1. A hydraulic control apparatus for controlling a hydraulically operated continuously variable transmission of a motor vehicle whose speed ratio is continuously variable, comprising:

pressure generating means for producing an actuating pressure;

a directional control valve including a first spool which is movable between a shift-down position and a shift-up position for changing said speed ratio of said transmission in a shift-down and a shift-up direction, respectively, said first spool being moved to said shift-up position when said actuating pressure is not applied to said first spool;

a first solenoid-operated valve responsive to a first electric signal, for applying said actuating pressure to said first spool to move said first spool to said shift-down position;

a flow control valve including a second spool which is movable between a flow-restricting position for restricting a flow of a fluid therethrough for establishing a first rate at which said speed ratio of said transmission is changed, and a non-restricting position for establishing a second rate higher than said first rate, said second spool being moved to said flow-restricting position when said actuating pressure is not applied to said second spool; and a second solenoid-operated valve responsive to a second electric signal, for applying said actuating pressure to said second spool to move said second spool to said non-restricting position.

2. A hydraulic control apparatus according to claim 1, wherein said directional control valve further includes a spring for biasing said first spool toward said shift-up position.

3. A hydraulic control apparatus according to claim 1, wherein said flow control valve further includes a spring for biasing said second spool toward said flow-restricting position.

4. A hydraulic control apparatus according to claim 1, wherein said continuously variable transmission includes a pair of variable-diameter pulleys, a transmission belt connecting said pair of pulleys, and a first and a second hydraulic actuator for changing effective diameters of said pair of pulleys.

5. A hydraulic control apparatus according to claim 4, further comprising a first and a second pressure line through which a first line pressure and a second line pressure lower than said first line pressure are supplied to said directional control valve, respectively, and a first, a second and a third connecting line connected to said directional control valve, and wherein said first and second hydraulic actuators selectively receive said first and second line pressures, for changing the effective diameters of said pair of pulleys, said directional control valve including a drain port, a first and a second input port connected to said first pressure line, a third input port connected to said second pressure line, a first output port, a second output port, and a third output port, said first spool being moved to said shift-up position for fluid communication between said first output and input ports, between said second output and input ports and between said third output and input ports, and moved to said shift-down position for fluid communication between said first output port and said drain port and between said third output port and said second input port, said flow control valve including a fourth input port communicating with said first output port through said first connecting line, a fourth output port communicating with said second output port through said second connecting line and communicating with said first hydraulic actuator, a fifth output port communicating with said second hydraulic actuator, and a fifth input port communicating with said third output port through said third connecting line, said second spool being moved to said non-restricting position for fluid communication between said fourth output and input ports and between said fifth output and input ports, and moved to said flow-restricting position for fluid communication between said fourth output and input ports and said fifth output and input ports.

6. A hydraulic control apparatus according to claim 4, wherein said first and second solenoid-operated valves have respective solenoid coils which are both turned off to establish a slow shift-up mode of said transmission in which said transmission is slowly shifted up, said hydraulic control apparatus further comprising pilot pressure generating means for producing a pilot pressure, and wherein said directional control valve further includes means for defining a shift-down chamber for receiving said pilot pressure to move said first spool toward said shift-down position.

7. A hydraulic control apparatus according to claim 6, wherein said directional control valve further includes a plunger having opposite ends one of which partially defines said shift-down chamber and the other of which is in abutting contact with an end of said first spool (280), said actuating pressure being applied between said end of the first spool and said other end of said plunger.

8. A hydraulic control apparatus according to claim 6, further comprising a pressure regulating valve including a third spool operable for producing a tension control pressure for controlling a tension of said transmission belt, and means for defining a chamber for receiving said pilot pressure so that said third spool is moved to change said tension control pressure depending upon said pilot pressure.

9. A hydraulic control apparatus for controlling a hydraulically operated continuously variable transmission of a motor vehicle which includes a pair of variable-diameter pulleys, a transmission belt connecting said pair of pulleys, and a first and a second hydraulic actuator which selectively receive a first line pressure and a second line pressure lower than said first line pressure, for changing effective diameters of said pair of pulleys and thereby continuously changing a speed ratio of said transmission, said first and second line pressures being supplied through a first and a second pressure line, respectively, said hydraulic control apparatus comprising:

a directional control valve including a drain port, a first and a second input port connected to said first pressure line, a third input port connected to said second pressure line, a first output port, a second output port, a third output port, and a first spool which is movable between a shift-up position for fluid communication between said first output and input ports, between said second output and input ports and between said third output and input ports, and a shift-down position for fluid communication between said first output port and said drain port and between said third output port and said second input port;

a first, a second and a third connecting line connected to said first, second and third output ports, respectively; and a flow control valve including a fourth input port communicating with said first output port through said first connecting line, a fourth output port communicating with said second output port through said second connecting line and communicating with said first hydraulic actuator, a fifth output port communicating with said second hydraulic actuator, a fifth input port communicating with said third output port through said third connecting line, and a second spool which is movable between a non-restricting position for fluid communication between said fourth output and input ports and between said fifth output and input ports, and a flow-restricting position for fluid communication between said fourth output and input ports and said fifth output and input ports.

10. A hydraulic control apparatus for controlling a hydraulically operated continuously variable transmission whose speed ratio is continuously variable, said hydraulic control apparatus comprising:

a directional control valve including a first spool which is movable between a shift-down position and a shift-up position for changing said speed ratio of said transmission in a shift-down and a shift-up direction, respectively;

pressure generating means for producing an actuating pressure;

a first solenoid-operated valve operable for applying said actuating pressure to said first spool;

a flow control valve including a second spool which is movable between a flow-restricting position for restricting a flow of a fluid therethrough for establishing a first rate at which said speed ratio of said transmission is changed, and a non-restricting position for establishing a second rate higher than said first rate;

a second solenoid-operated valve operable for applying said actuating pressure to said second spool;

said first and second solenoid-operated valves having respective solenoid coils which are both turned off to establish a slow shift-up mode of said transmission in which said transmission is slowly shifted up;

pilot pressure generating means for producing a pilot pressure; and said directional control valve further including means for defining a shift-down chamber for receiving said pilot pressure to move said first spool toward said shift-down position.

11. A hydraulic control apparatus according to claim 10, wherein said directional control valve further includes a plunger having opposite ends one of which partially defines said shift-down chamber and the other of which is in abutting contact with an end of said first spool, said actuating pressure being applied between said end of the first spool and said other end of said plunger.

12. A hydraulic control apparatus according to claim 10, wherein said continuously variable transmission includes a pair of variable-diameter pulleys, a transmission belt connecting said pair of pulleys, and a first and a second hydraulic actuator for changing effective diameters of said pair of pulleys, said hydraulic control apparatus further comprising a pressure regulating valve including a third spool operable for producing a tension control pressure for controlling a tension of said transmission belt, and means for defining a chamber for receiving said pilot pressure so that said third spool is moved to increase said tension control pressure depending upon said pilot pressure.

13. A hydraulic control apparatus according to claim 10, further comprising an electronic control device which includes a trouble detecting circuit for detecting a trouble with said first solenoid-operated valve.

14. A hydraulic control apparatus according to claim 13, wherein when said electronic control device detects a trouble with said solenoid coil of said first solenoid-operated valve while said vehicle is running at a speed exceeding a predetermined limit, said control device controls said pilot pressure generating means so as not to produce said pilot pressure, so that said first spool is maintained in said shift-up position.

15. A hydraulic control apparatus according to claim 13, wherein when said electronic control device detects a trouble with said solenoid coil of said first solenoid-operated valve while said vehicle is not running at a speed exceeding a predetermined limit, said control device controls said pilot pressure generating means so as to produce said pilot pressure, so that said first spool is moved toward said shift-up position.

* * * * *

UNITED STATES PATENT AND TRADEMARK OFFICE
CERTIFICATE OF CORRECTION

PATENT NO. : 5,052,247
DATED : October 1, 1991
INVENTOR(S) : Nobuyuki Kato et al.

It is certified that error appears in the above-identified patent and that said Letters Patent is hereby corrected as shown below:

On the title page item [30]:

The fifth priority data has been omitted, should be,

--July 20, 1990  [JP]  Japan..................2-193599--.

Signed and Sealed this

Twenty-fifth Day of May, 1993

Attest:

MICHAEL K. KIRK

Attesting Officer

Acting Commissioner of Patents and Trademarks